United States Patent
Maehira et al.

(10) Patent No.: US 11,077,672 B2
(45) Date of Patent: Aug. 3, 2021

(54) CONTROL DEVICE AND NON-TRANSITORY COMPUTER-READABLE MEDIUM

(71) Applicant: BROTHER KOGYO KABUSHIKI KAISHA, Nagoya (JP)

(72) Inventors: Hirotoshi Maehira, Nagoya (JP); Masao Mimoto, Kitanagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/804,536

(22) Filed: Feb. 28, 2020

(65) Prior Publication Data

US 2020/0282743 A1 Sep. 10, 2020

(30) Foreign Application Priority Data

Mar. 9, 2019 (JP) .............................. JP2019-043230

(51) Int. Cl.
*B41J 2/21* (2006.01)
*H04N 1/405* (2006.01)
*B41J 2/045* (2006.01)

(52) U.S. Cl.
CPC ......... *B41J 2/2135* (2013.01); *B41J 2/04586* (2013.01); *B41J 2/2125* (2013.01); *H04N 1/405* (2013.01)

(58) Field of Classification Search
CPC .... B41J 2/04505; B41J 2/04586; B41J 3/407; B41J 3/28; B41J 11/008; B41J 11/46; B41J 2/04526; B41J 2/04503
See application file for complete search history.

(56) References Cited

U.S. PATENT DOCUMENTS

| | | | |
|---|---|---|---|
| 9,836,675 B2* | 12/2017 | Fukazawa | G06K 15/1868 |
| 2005/0104916 A1* | 5/2005 | Nagashima | B41J 2/2107 347/15 |
| 2006/0187251 A1* | 8/2006 | Pulver | B41J 2/04563 347/13 |
| 2012/0212534 A1* | 8/2012 | Tanase | B41J 2/155 347/15 |
| 2018/0213125 A1 | 7/2018 | Takeuchi et al. | |
| 2019/0299603 A1 | 10/2019 | Maehira | |
| 2019/0299608 A1 | 10/2019 | Maehira et al. | |

FOREIGN PATENT DOCUMENTS

| | | |
|---|---|---|
| JP | 2018-118382 A | 8/2018 |
| JP | 2019-171590 A | 10/2019 |
| JP | 2019-177511 A | 10/2019 |

* cited by examiner

*Primary Examiner* — Kristal Feggins
(74) *Attorney, Agent, or Firm* — Scully, Scott, Murphy & Presser, PC

(57) ABSTRACT

A control device is configured to: obtain target image data; generate dot data using the target image data; and control a print execution device to print a print image using the dot data by executing: a first partial printing of forming the dots in an overlapping area and a first non-overlapping area; and a second partial printing of forming the dots in the overlapping area and a second non-overlapping area. The control device generates data of the dot data corresponding to the overlapping area by executing an overlapping area processing including first processing for values of pixels within a first range and second processing for values of pixels within a second range, the first processing including lowering a density of an image to be printed in the overlapping area.

15 Claims, 11 Drawing Sheets

PATTERN DATA

PRINTING RATE

CHROMATIC AREA Ab~Ae

ACHROMATIC AREA Aa

CONTROL DEVICE AND NON-TRANSITORY COMPUTER-READABLE MEDIUM

CROSS-REFERENCE TO RELATED APPLICATIONS

This application claims priority from prior Japanese patent application No. 2019-043230, filed on Mar. 9, 2019, the entire contents of which are incorporated herein by reference.

TECHNICAL FIELD

The present disclosure relates to control of a print execution device including a print head having a plurality of nozzles and a mover configured to relatively move a printing medium relative to the print head.

BACKGROUND

There has been proposed a related-art printer that prints a part of an area in the vicinity of a boundary of a band through two passes when performing printing through a plurality of passes. As a look-up table that is used in color conversion processing of a joint area to be printed through the two passes, a table different from a look-up table that is used in color conversion processing of a normal area to be printed through single pass is used. Thereby, it is disclosed that color variation occurring in the joint area can be reduced.

SUMMARY

The technology of the present disclosure may be implemented as following application examples.

According to one application example, there may be provided a control device for controlling a print execution device, the print execution device comprising a print head having a plurality of nozzles configured to eject ink, a head driver configured to cause the print head to eject the ink to form dots on a printing medium, and a mover configured to move the printing medium relative to the print head in a moving direction, the control device being configured to: obtain target image data; generate dot data indicating a formation state of the dots for each pixel using the target image data; and control the print execution device to print a print image using the dot data by alternately executing a partial printing of controlling the print head to form the dots and a moving of controlling the mover to move the printing medium for plural times, wherein in the controlling of the print execution device, the control device is configured to: control the print execution device to execute a first partial printing; control the mover to move the printing medium by a specific moving amount after the first partial printing; and control the print execution device to execute a second partial printing after moving the printing medium by the specific moving amount, in the first partial printing, the control device being configured to control the print head to: form the dots in an overlapping area and a first non-overlapping area, the overlapping area including an upstream end of an area printable by the first partial printing with respect to the moving direction, the first non-overlapping area being a non-overlapping area different from the overlapping area and located downstream of the overlapping area of the area printable by the first partial printing with respect to the moving direction; and not to form the dots in a second non-overlapping area, the second non-overlapping area being a non-overlapping area located upstream of the overlapping area of an area printable by the second partial printing with respect to the moving direction, and in the second partial printing, the control device being configured to control the print head to: form the dots in the overlapping area and the second non-overlapping area; and not to form the dots in the first non-overlapping area, wherein in the generating of the dot data, the control device is configured to: generate first data of the dot data, the first data corresponding to the non-overlapping area, by executing non-overlapping area processing for non-overlapping area data of the target image data, the non-overlapping area data corresponding to the non-overlapping area; and generate second data of the dot data, the second data corresponding to the overlapping area, by executing overlapping area processing for overlapping area data of the target image data, the overlapping area processing being different from the non-overlapping area processing, the overlapping data corresponding to the overlapping area, wherein the overlapping area processing includes: first processing to be executed for values of pixels within a first range; and second processing to be executed for values of pixels within a second range different from the first range, the second processing being different from the first processing; and wherein the first processing includes first density lowering processing of lowering a density of an image to be printed in the overlapping area, as compared to if the non-overlapping area processing was executed on the overlapping area data.

According to the above configuration, the overlapping area processing that is executed on the overlapping area data of the target image data includes the first processing that is executed for the values of pixels within the first range, and the second processing that is executed for the values of pixels within the second range. The first processing includes the first density lowering processing of lowering the density of the image to be printed in the overlapping area. As a result, it is possible to execute the appropriate processing for the values of pixels within the first range and the values of pixels within the second range, respectively. As a result, it is possible to efficiently suppress color variation between the overlapping area to be printed through two partial printings and the non-overlapping area to be printed through single partial printing.

In the meantime, the technology of the present disclosure can be implemented in a variety of forms, such as a printing apparatus, a control method of the print execution device, a printing method, a computer program for implementing functions of the apparatus and method, a non-transitory computer-readable medium storing the computer program, and the like.

BRIEF DESCRIPTION OF DRAWINGS

Illustrative embodiments of the disclosure will be described in detail based on the following figures, wherein.

DETAILED DESCRIPTION

The above-described related-art technology simply discloses that a degree of occurrence of the color variation in the joint area is different depending on a material of the printing medium, a temperature, and a humidity, and does not sufficiently consider a difference by a color of the joint area. For this reason, there is a possibility that the color variation in the joint area cannot be reduced depending on the color of the joint area.

The present disclosure discloses technology capable of sufficiently suppressing color variation between an area to be printed through two partial printings and an area to be printed through single partial printing.

A. First Illustrative Embodiment

A-1: Configuration of Printing System 1000

Figure 1:
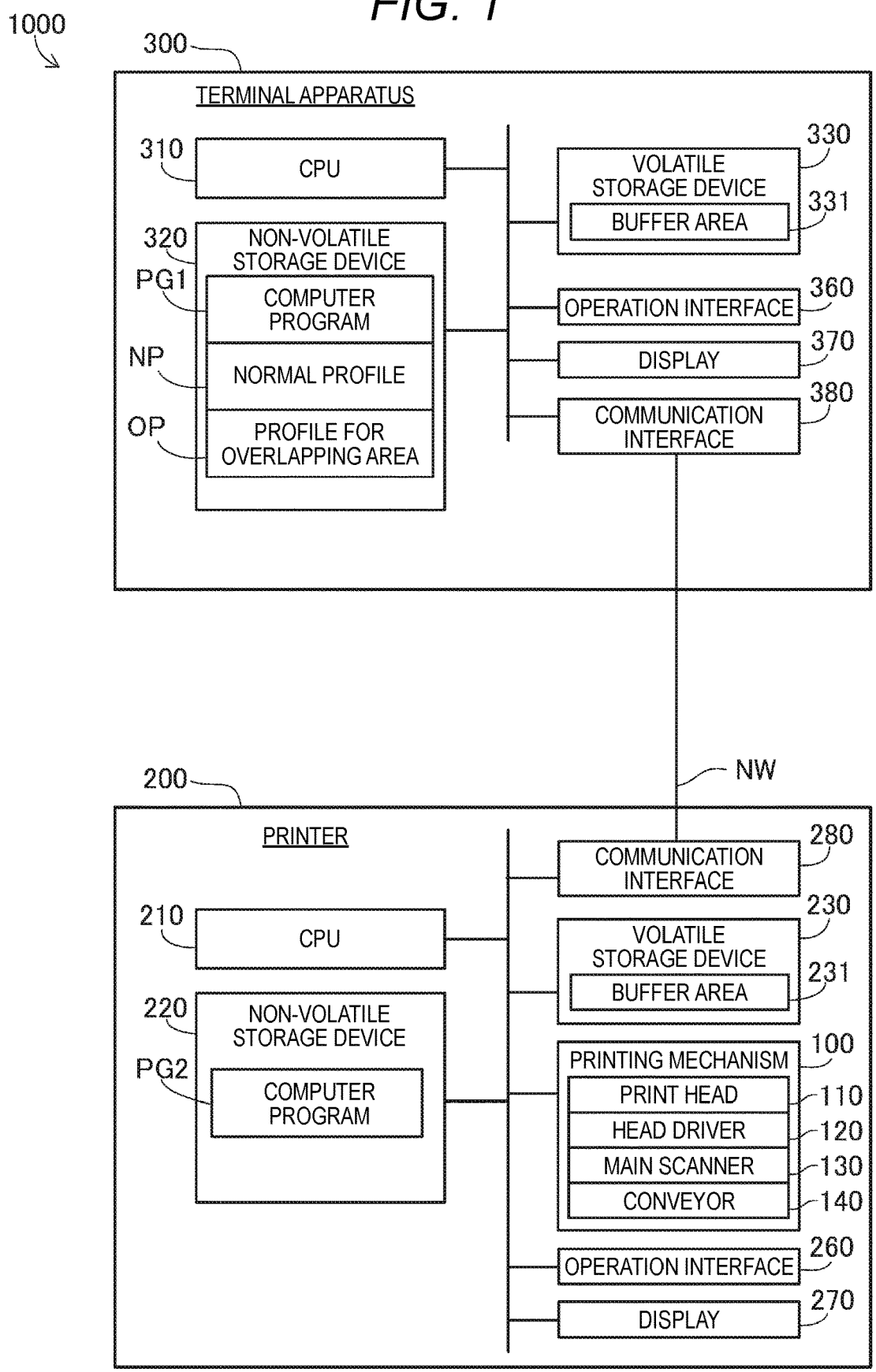
FIG. 1 is a block diagram depicting a configuration of a printing system 1000 of an illustrative embodiment.

Hereinbelow, an illustrative embodiment is described. FIG. 1 is a block diagram depicting a configuration of a printing system 1000 of an illustrative embodiment.

The printing system 1000 includes a printer 200, and a terminal apparatus 300 as a control device of the first illustrative embodiment. The printer 200 and the terminal apparatus 300 are communicatively connected to each other via a wired or wireless network NW.

The terminal apparatus 300 is a calculator that is used by a user of the printer 200, and is, for example, a personal computer or a smart phone. The terminal apparatus 300 includes a CPU 310 as a controller of the terminal apparatus 300, a non-volatile storage device 320 such as a hard disk drive, a volatile storage device 330 such as a RAM, an operation interface 360 such as a mouse and a keyboard, a display 370 such as a liquid crystal monitor, and a communication interface 380. The communication interface 380 includes a wired or wireless interface for connection to the network NW.

The volatile storage device 330 provides a buffer area 331 for the CPU 310. In the non-volatile storage device 320, a computer program PG1 and a plurality of profiles NP and OP are stored. The computer program PG1 and the plurality of profiles NP and OP are provided by a manufacturer of the printer 200 in such an aspect that it is downloaded from a server or stored in a DVD-ROM or the like. The CPU 310 is configured to execute the computer program PG1, thereby functioning as a printer driver configured to control the printer 200. The CPU 310 as the printer driver is configured to execute image processing, which will be described later, thereby causing the printer 200 to print an image, for example.

The plurality of profiles NP and OP is respectively a profile of defining a correspondence relation between color values (e.g., RGB values) of an RGB color coordinate system and color values (e.g., CMYK values) of a CMYK color coordinate system. The plurality of profiles NP and OP is used for color conversion processing of converting RGB values into CMYK values in image processing that will be described later. The RGB values are color values including three component values of red (R), green (G) and blue (B). The CMYK values are color values including a plurality of component values corresponding to a plurality of types of inks to be used for printing, in the first illustrative embodiment, component values of cyan (C), magenta (M), yellow (Y) and black (K). The RGB values and the CMYK values are, for example, values of 256 gradations. The plurality of profiles NP and OP is, for example, a look-up table. The plurality of profiles NP and OP will be described later.

The printer 200 includes, for example, a printing mechanism 100, a CPU 210 as a controller of the printer 200, a non-volatile storage device 220 such as a hard disk drive, a volatile storage device 230 such as a RAM, an operation interface 260 such as buttons and a touch panel for obtaining a user's operation, a display 270 such as a liquid crystal monitor, and a communication interface 280. The communication interface 280 includes a wired or wireless interface for connection to the network NW. The printer 200 is communicatively connected to an external apparatus, for example, the terminal apparatus 300 via the communication interface 280.

The volatile storage device 230 provides a buffer area 231 for temporarily storing therein a variety of intermediate data that are generated when the CPU 210 performs processing. In the non-volatile storage device 220, a computer program PG2 is stored. In the first illustrative embodiment, the computer program PG2 is a control program for controlling the printer 200, and may be provided while being stored in the non-volatile storage device 220 upon shipment of the printer 200. Instead of this configuration, the computer program PG2 may be downloaded from a server or may be provided while being stored in a DVD-ROM and the like. The CPU 210 is configured to execute the computer program PG2, thereby controlling the printing mechanism 100 to print an image on a printing medium (for example, sheet) according to partial printing data that is transmitted from the terminal apparatus 300 by image processing (which will be described later).

The printing mechanism 100 is configured to eject respective inks (ink droplets) of cyan (C), magenta (M), yellow (Y) and black (K), thereby performing printing. The printing mechanism 100 includes a print head 110, a head driver 120, a main scanner 130, and a conveyor 140.

Figure 2A:
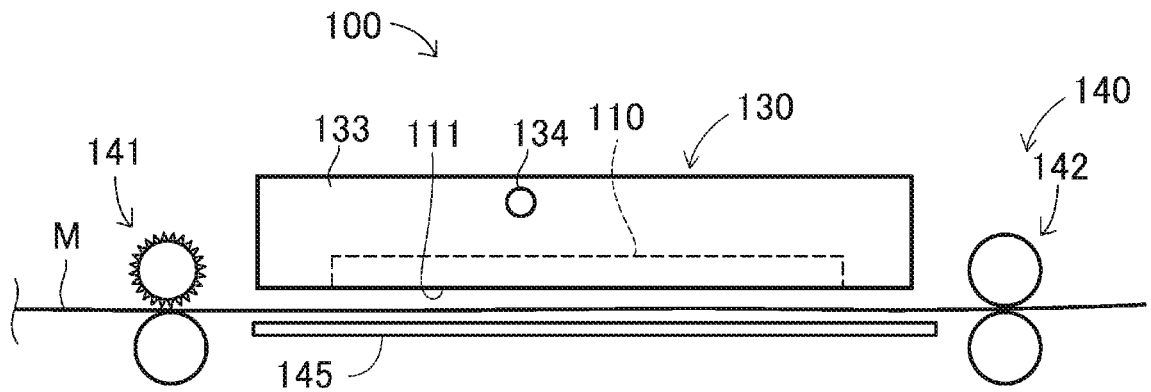
FIGS. 2A and 2B depict schematic configurations of a printing mechanism 100.
Figure 2B:
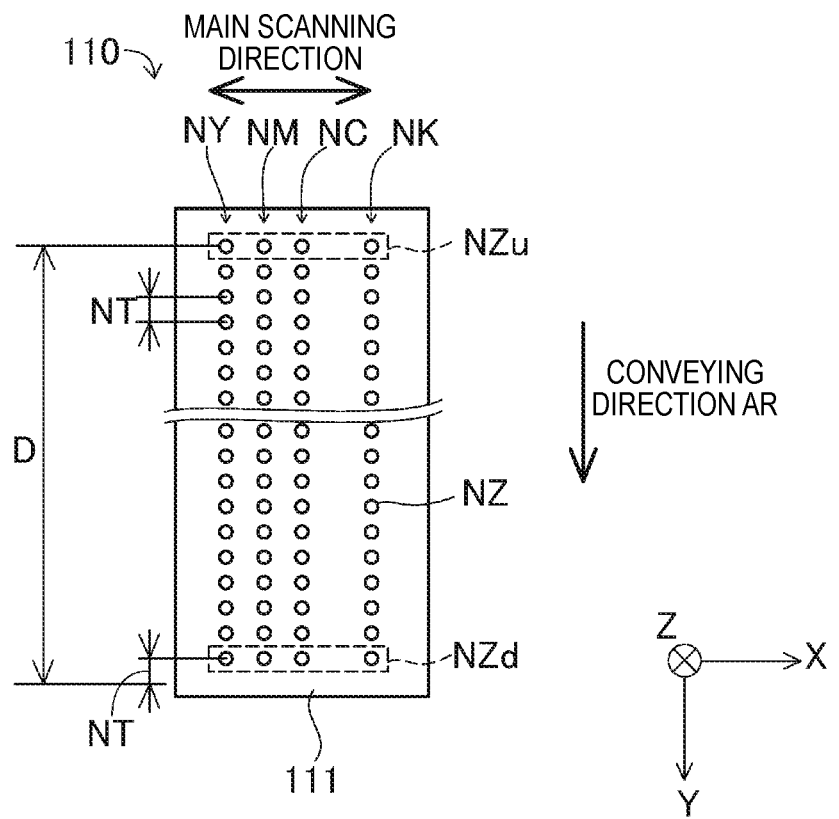

FIGS. 2A and 2B depict schematic configurations of the printing mechanism 100. As shown in FIG. 2A, the main scanner 130 includes a carriage 133 on which the print head 110 is mounted, and a slide shaft 134 configured to hold the carriage 133 to be reciprocally movable in a main scanning direction (X-axis direction, in FIG. 2A). The main scanner 130 is configured to reciprocally move the carriage 133 along the slide shaft 134 by using power of a main scanning motor (not shown). Thereby, a main scanning of reciprocally moving the print head 110 relative to the sheet M in the main scanning direction is implemented.

The conveyor 140 is configured to convey the sheet M in a conveying direction AR (+Y direction, in FIG. 2A) intersecting with the main scanning direction while holding the sheet M. As shown in FIG. 2A, the conveyor 140 includes a sheet platen 145, a pair of upstream rollers 142, and a pair of downstream rollers 141. Hereinbelow, an upstream side (−Y side) in the conveying direction AR is simply referred to as 'upstream side', and a downstream side (+Y side) in the conveying direction AR is simply referred to as 'downstream side'.

The pair of upstream rollers 142 is configured to hold the sheet M on a more upstream side (−Y side) than the print head 110, and the pair of downstream rollers 141 is configured to hold the sheet M on a more downstream side (+Y side) than the print head 110. The sheet platen 145 is arranged in a position facing a nozzle formation surface 111 of the print head 110 between the pair of upstream rollers 142 and the pair of downstream rollers 141. The pair of downstream rollers 141 and the pair of upstream rollers 142 are driven by a conveying motor (not shown), so that the sheet M is conveyed.

The head driver 120 (see FIG. 1) is configured to supply a drive signal to the print head 110 to drive the print head 110 while the main scanner 130 performs the main scanning of the print head 110. The print head 110 is configured to eject the inks to form dots on the sheet being conveyed by the conveyor 140, according to the drive signal.

FIG. 2B depicts a configuration of the print head 110, as seen from −Z side (a lower side, in FIG. 2B). As shown in FIG. 2B, the nozzle formation surface 111 of the print head 110 is formed with a plurality of nozzle rows each consisting of a plurality of nozzles, i.e., nozzle rows NC, NM, NY and NK for ejecting the respective inks of C, M, Y and K. Each nozzle row includes a plurality of nozzles NZ. The plurality of nozzles NZ has positions different from each other in the conveying direction AR (+Y direction), and is aligned with predetermined nozzle intervals NT in the conveying direction AR. The nozzle interval NT is a length in the conveying direction AR between two nozzles NZ, which are adjacent to each other in the conveying direction AR, of the plurality of nozzles NZ. A nozzle NZ, which is located on the most upstream side (−Y side), of the nozzles configuring the nozzle row is referred to as the most upstream nozzle NZu. Also, a nozzle NZ, which is located on the most downstream side (+Y side), of the nozzles is referred to as the most downstream nozzle NZd. A length obtained by adding the nozzle interval NT to a length in the conveying direction AR from the most upstream nozzle NZu to the most downstream nozzle NZd is referred to as 'nozzle length D'.

Positions of the nozzle rows NC, NM, NY and NK in the main scanning direction (X direction in FIG. 2B) are different from each other, and positions thereof in the conveying direction AR (Y direction in FIG. 2B) overlap each other. For example, in the example of FIG. 2B, the nozzle row NM is arranged in the +X direction of the nozzle row NY for ejecting yellow (Y) ink.

A-2. Image Processing

Figure 3:
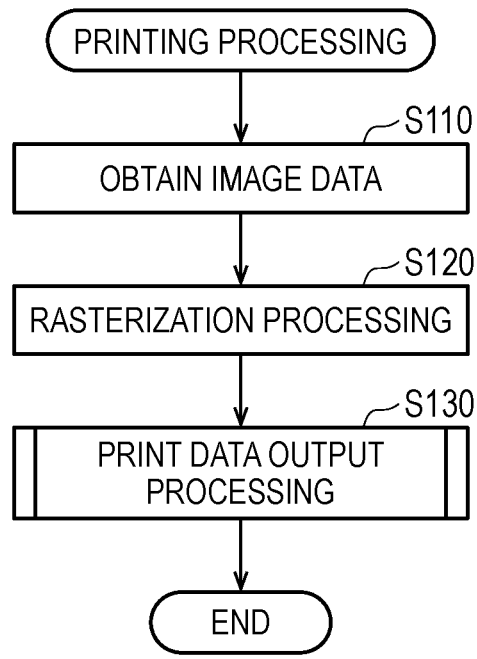
FIG. 3 is a flowchart of image processing.

The CPU 310 (see FIG. 1) of the terminal apparatus 300 executes image processing, based on a printing instruction from a user. The printing instruction includes a designation of image data indicative of an image to be printed. FIG. 3 is a flowchart of the image processing. In S110, the CPU 310 obtains the image data designated by the printing instruction from the non-volatile storage device 320. The image data to be obtained is image data having a variety of formats, such as image data compressed in a JPEG format, image data described in a page description language, and the like.

In S120, the CPU 310 executes rasterization processing on the obtained image data, thereby generating RGB image data indicative of colors of respective pixels with RGB values. Thereby, RGB image data as target image data of the first illustrative embodiment is obtained. The RGB values are, for example, color values including three component values of red (R), green (G) and blue (B).

In S130, the CPU 310 executes print data output processing by using the RGB image data. The print data output processing is processing of generating partial printing data for each single partial printing SP, which will be described later, adding diverse types of control data to the partial printing data, and outputting the same to the printing mechanism 100. The control data includes data of designating an amount of conveyance of sheet conveyance T to be executed after the partial printing SP. In the print data output processing, the partial printing data is output by a number of times of the partial printing SP to be executed. The print data output processing will be described in detail later.

Thereby, the CPU 310 can cause the printing mechanism 100 to print a print image PI. Specifically, the CPU 310 performs printing by controlling the head driver 120, the main scanner 130 and the conveyor 140 to execute alternately more than once the partial printing SP and the sheet conveyance T. In the single partial printing SP, while performing the single main scanning in a state in which the sheet M is stationary on the sheet platen 145, the inks are ejected onto the sheet M from the nozzles NZ of the print head 110, so that a part of an image to be printed is printed on the sheet M. The single sheet conveyance T is conveyance of moving the sheet M in the conveying direction AR by a predetermined amount of conveyance. In the first illustrative embodiment, the CPU 310 causes the printing mechanism 100 to execute the partial printing SPm m times (m: an integer of 3 or greater).

Figure 4:
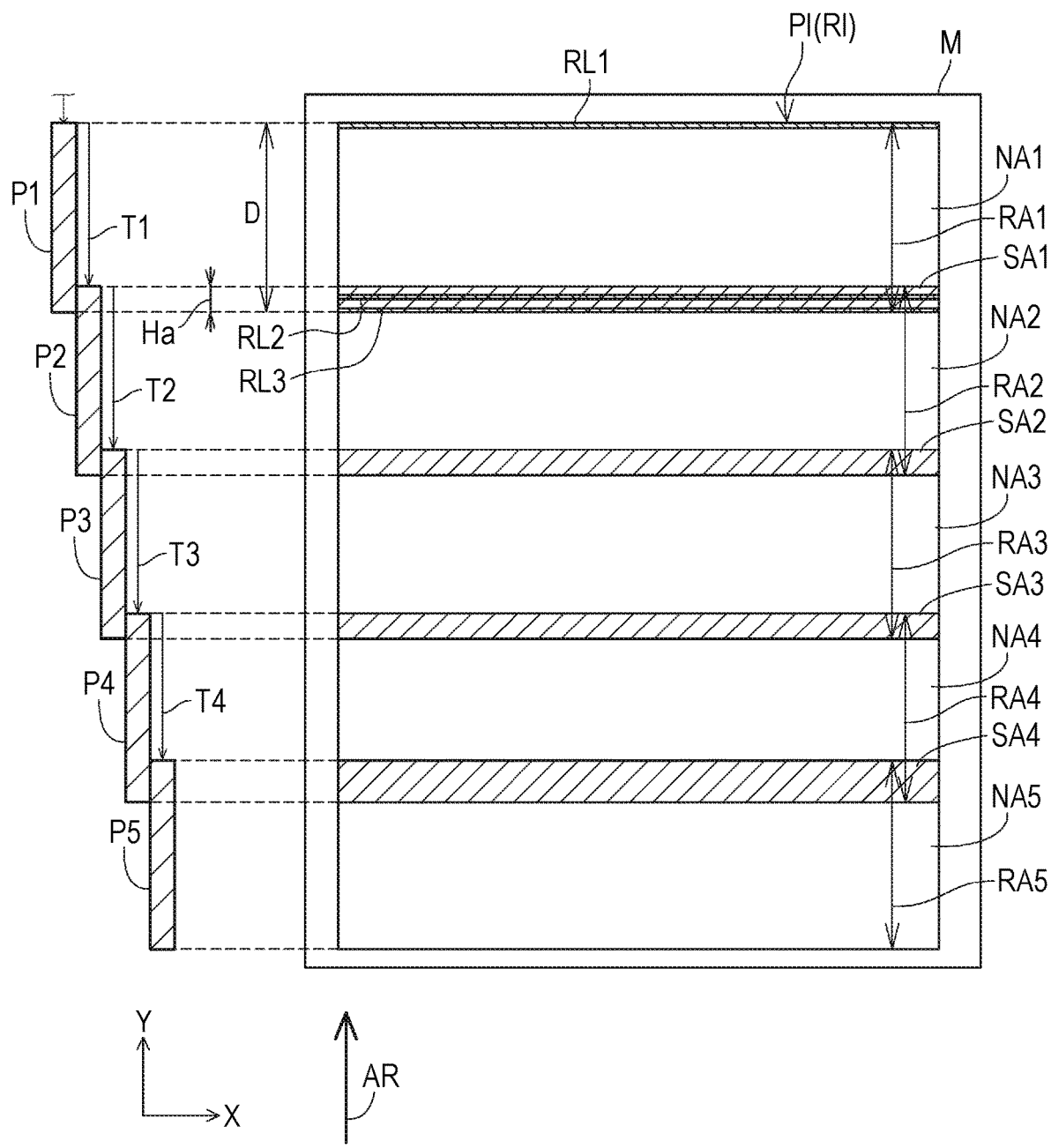
FIG. 4 depicts an example of a print image PI that is to be printed on a sheet M.

FIG. 4 depicts an example of the print image PI that is to be printed on the sheet M. In the example of FIG. 4, the print image PI is printed by five partial printings SP (m=5). Also, in FIG. 4, a head position P, i.e., a relative position of the print head 110 to the sheet M in the conveying direction is shown for each partial printing SP (i.e., for each main scanning) For each of the plurality of partial printings SP, a pass number k (k: an integer of 1 or larger and m or smaller) is added in order of execution, and the $k^{th}$ partial printing SP is also referred to as 'partial printing SPk'. The head position P upon execution of the partial printing SPk is referred to as 'head position Pk'. The sheet conveyance T that is to be executed between the $k^{th}$ partial printing SPk and the $(k+1)^{th}$ partial printing SP(k+1) is also referred to as '$k^{th}$ sheet conveyance Tk'. In FIG. 4, the head positions P1 to P5 and sheet conveyances T1 to T4 corresponding to the first to fifth partial printings SP1 to SP5 are shown.

Meanwhile, in FIG. 4, the print image PI formed on the sheet S includes a plurality of non-overlapping areas NA1 to NA5 (areas not hatched in FIG. 4) and a plurality of overlapping areas SA1 to SA4 (areas hatched in FIG. 4).

Each of the non-overlapping areas NA1 to NA5 is an area in which an image is formed by only single partial printing. For example, in the non-overlapping area NAk, dots are formed only by the $k^{th}$ partial printing SPk, i.e., the partial printing SPk to be performed in the head position Pk. In the non-overlapping area NAk, no dot is formed in the $(k+1)^{th}$ partial printing SP(k+1) or $(k−1)^{th}$ partial printing SP(k−1).

Each of the overlapping areas SA1 and SA2 is an area in which an image is formed by two partial printings. Specifically, in the overlapping area SAk, dots are formed by the $k^{th}$ partial printing SPk and the $(k+1)^{th}$ partial printing SP(k+1). That is, in the overlapping area SAk, dots are formed by the partial printing SPk to be performed in the head position Pk and the partial printing SP(k+1) to be performed in the head position P(k+1). The overlapping area SAk is located between the non-overlapping area NAk and the non-overlapping area NA(k+1).

In the meantime, as shown in FIG. 4, a partial area RA1 that can be printed by the first partial printing SP1 includes an overlapping area SA1 including an upstream end of the partial area RA1 and a non-overlapping area NA1 on a further downstream side than the overlapping area SA1. Partial areas RA2 to RA4 that can be printed by the second to fourth partial printings SP2 to SP4 include, respectively, an overlapping area SAk including an upstream end of the partial area RAk, an overlapping area SA(k−1) including a downstream end of the partial area RAk, and a non-overlapping area NAk on a further downstream side than the overlapping area SAk and on a further upstream side than the overlapping area SA(k−1) (k is one of 2 to 4). A partial area RA5 that can be printed by the final partial printing SP includes an overlapping area SA4 including a downstream end of the partial area RA5, and a non-overlapping area NA5 on a further upstream side than the overlapping area SA4.

The reason to provide the overlapping area SAk is described. A case in which a print image is configured only by an image to be printed in a non-overlapping area without the overlapping area SAk is assumed. In this case, a malfunction referred to as so-called banding that a white stripe or a black stripe occurs at a boundary between two non-overlapping areas adjacent to each other in the conveying direction AR due to variation in amount of conveyance of the sheet M may occur. The banding deteriorates an image quality of the print image PI. When an overlapping area SAk is provided between the two non-overlapping areas NAk and an image is printed in the corresponding area, the malfunction referred to as so-called banding can be suppressed. That is, in the overlapping area, dots on one rasterization line are formed by the two partial printings. Accordingly, all dots on one rasterization line can be suppressed from being similarly shifted from all dots on another rasterization line.

A-3. Print Data Output Processing

Figure 5:
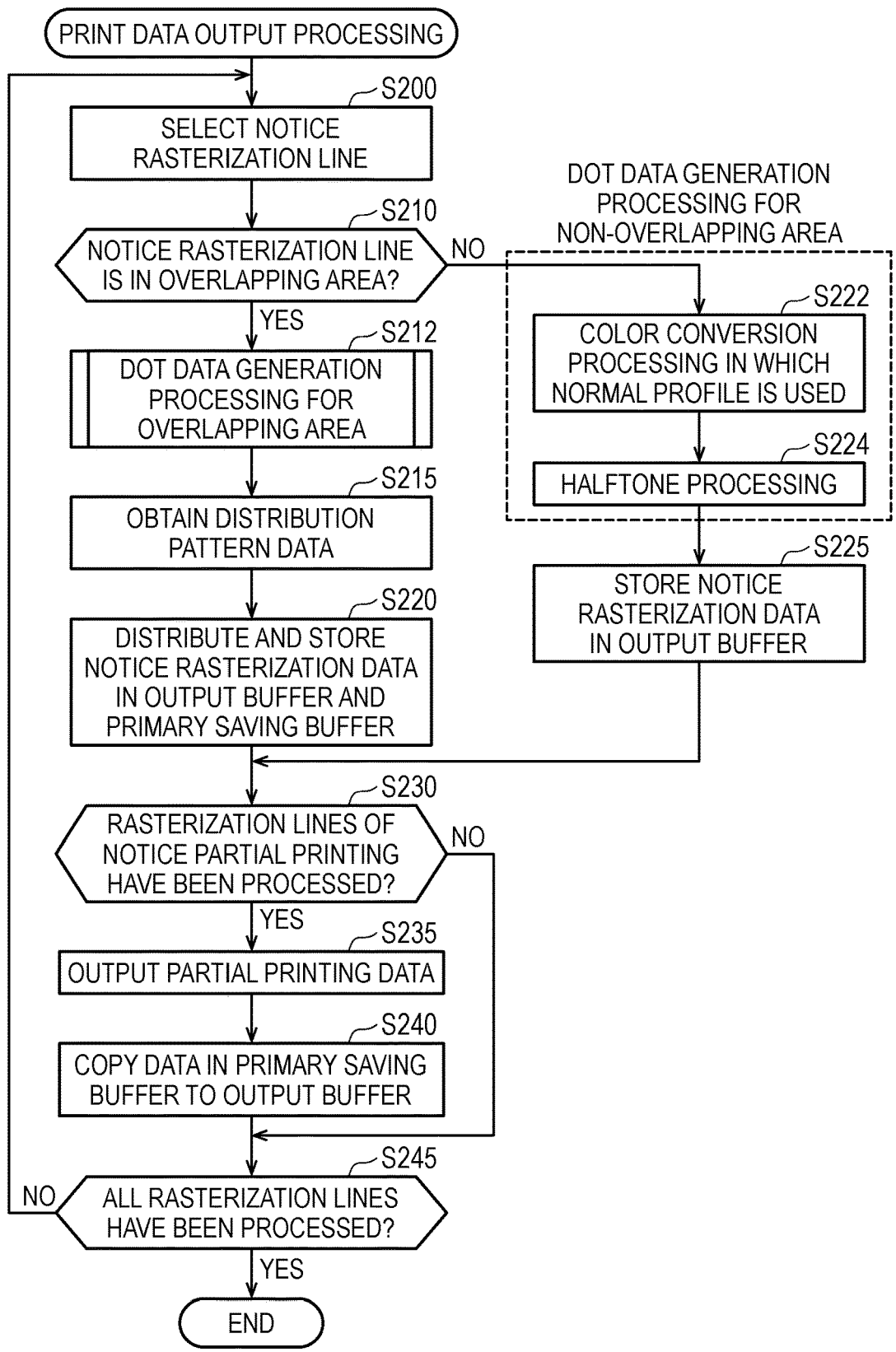
FIG. 5 is a flowchart of print data output processing.

Subsequently, the print data output processing of S130 in FIG. 3 is described. As described above, the print data output processing is processing of generating partial printing data for each single partial printing SP by using the RGB image data, adding diverse types of control data to the partial printing data, and outputting the same to the printing mechanism 100. FIG. 5 is a flowchart of the print data output processing.

An RGB image RI expressed by the RGB image data, which is a target of the color conversion processing, corresponds to the print image PI of FIG. 4. For this reason, it can be said that FIG. 4 depicts the RGB image RI. The RGB image RI includes a plurality of rasterization lines RL (for example, RL1 in FIG. 4) extending in the X direction (a direction corresponding to the main scanning direction upon printing) in FIG. 4 and having positions different from each other in the Y direction. Each rasterization line RL is a line extending in the X direction in FIG. 4 and is configured by a plurality of pixels.

In S200, the CPU 310 sequentially selects one notice rasterization line from the plurality of rasterization lines RL, from a side (+Y side in FIG. 4) corresponding to the downstream side in the conveying direction AR upon printing, for example. For example, the first notice rasterization line is the rasterization line RL1 of FIG. 4.

Herein, the partial printing SP of printing the notice rasterization line is also referred to as 'notice partial printing'. However, when the notice rasterization line is printed by the two partial printings SP, i.e., the notice rasterization line is located in the overlapping area, the partial printing, which is executed first, of the two partial printings is set as the notice partial printing. For example, when the rasterization lines RL1 to RL3 of FIG. 4 are the notice rasterization lines, the notice partial printing is the partial printing SP1 that is executed in the head position P1 (see FIG. 4).

In S210, the CPU 310 determines whether the notice rasterization line is located in the overlapping area. For example, in a case in which the rasterization lines RL2 and RL3 of FIG. 4 are the notice rasterization lines, it is determined that the notice rasterization line is located in the overlapping range.

When it is determined that the notice rasterization line is not located in the overlapping area (S210: NO), i.e., when it is determined that the notice rasterization line is located in the non-overlapping area, the CPU 310 executes dot data generation processing for non-overlapping area, in S222 and S224.

In S222, the CPU 310 executes color conversion processing, in which a normal profile NP is used, on data, which corresponds to the notice rasterization line, of the RGB image data. Thereby, the plurality of values of pixels configuring the notice rasterization line is converted from the RGB values into the CMYK values.

In S224, the CPU 310 executes halftone processing on data corresponding to the notice rasterization line subjected to the color conversion processing. Thereby, dot data of data corresponding to the notice rasterization line is generated. The dot data is data that indicates a dot formation state of each pixel for each color component of CMYK. The respective values of pixels of the dot data indicate the dot formation states of two gradations "there is no dot" and "there is a dot" or four gradations "there is no dot", "small", "medium" and "large". The halftone processing is executed using a well-known method such as a dithering method, an error diffusion method and the like.

When it is determined that the notice rasterization line is not located in the overlapping area, dots corresponding to the plurality of pixels included in the notice rasterization line should be all formed by the notice partial printing. For this reason, in S225, the CPU 310 stores the generated dot data of the notice rasterization line in an output buffer.

Figure 6:
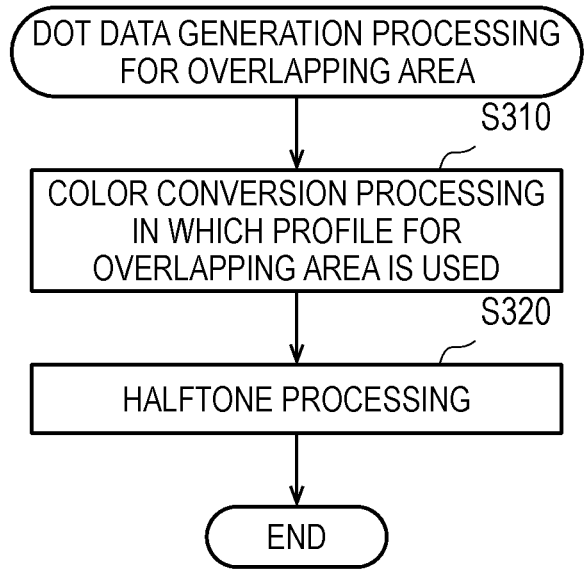
FIG. 6 is a flowchart of dot data generation processing for overlapping area of a first illustrative embodiment.

When it is determined that the notice rasterization line is located in the overlapping area (S210: YES), in S212, the CPU 310 executes dot data generation processing for overlapping area. FIG. 6 is a flowchart of the dot data generation processing for overlapping area.

In S310 of FIG. 6, the CPU 310 executes color conversion processing, in which a profile OP for overlapping area is used, on the data, which corresponds to the notice rasterization line, of the RGB image data. Thereby, the plurality of values of pixels configuring the notice rasterization line is converted from the RGB values into the CMYK values.

In S320, the CPU 310 executes the halftone processing on the data of the notice rasterization line subjected to the color conversion processing. Thereby, dot data of the notice rasterization line is generated.

Figure 7A:
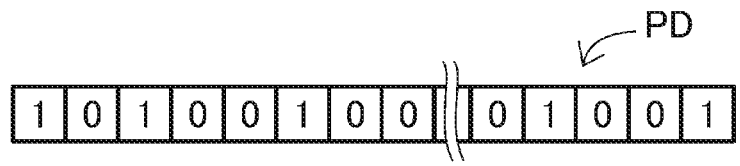
FIGS. 7A and 7B depict distribution pattern data PD and printing rates of partial printing in head positions P2 to P4.
Figure 7B:
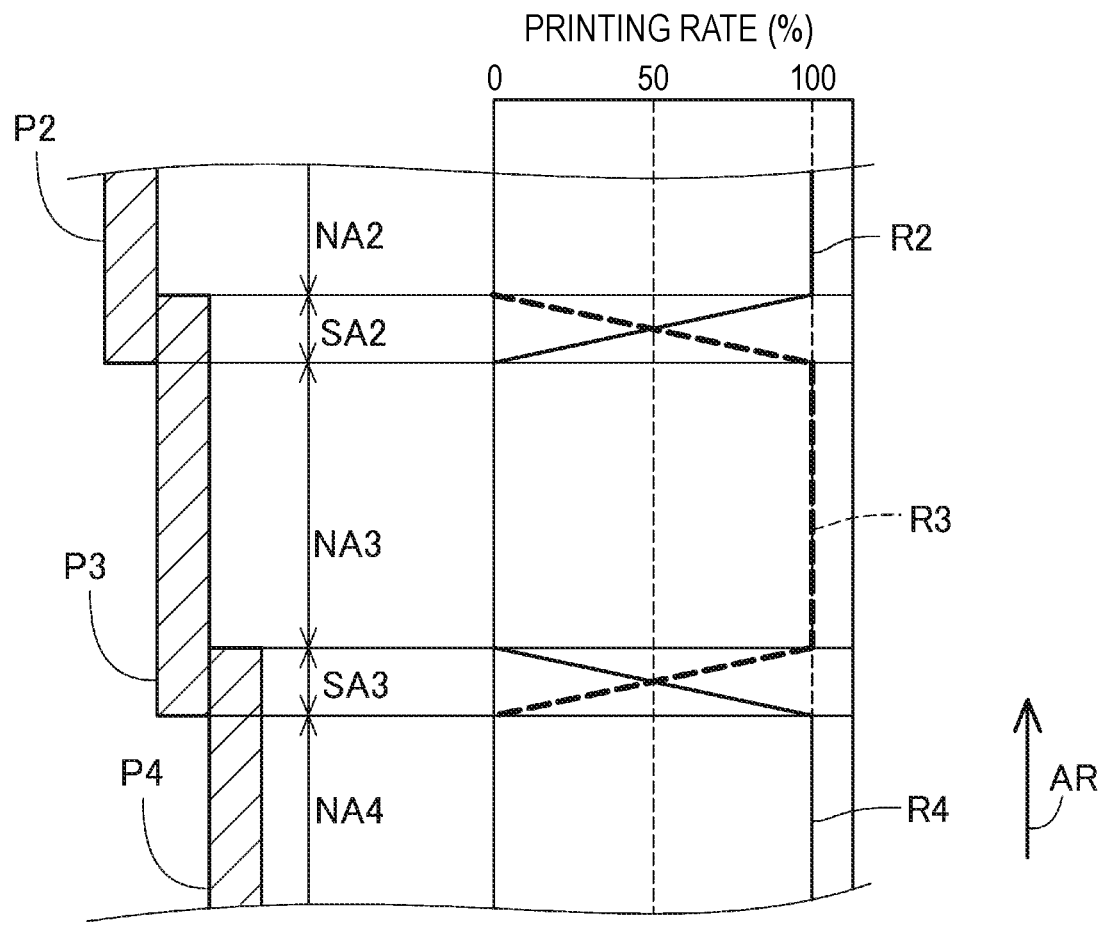

In S215 of FIG. 5, the CPU 310 obtains distribution pattern data PD corresponding to the notice rasterization line. FIGS. 7A and 7B depict distribution pattern data PD and printing rates of the partial printings in the head positions P2 to P4. As shown in FIG. 7A, the distribution pattern data PD is binary data having values corresponding to respective pixels of the notice rasterization line. A value "0" of the distribution pattern data PD indicates that a dot corresponding to the pixel is to be formed by the notice partial printing. A value "1" of the distribution pattern data PD indicates that a dot corresponding to the pixel is to be formed by partial printing after the notice partial printing.

Herein, the printing rates R2, R3 and R4 in FIG. 7B are printing rates of the partial printings SP2, SP3 and SP4 in the head positions P2, P3 and P4. In FIG. 7B, the printing rates R2, R3 and R4 are respectively shown in positions in the conveying direction AR. In a range in the conveying direction AR corresponding to the non-overlapping area NA2 (see FIG. 4), the printing rate R2 is 100%. Likewise, in ranges in the conveying direction AR corresponding to the non-overlapping areas NA3 and NA4 (see FIG. 4), the printing rates R3 and R4 are respectively 100%.

In a range in the conveying direction AR corresponding to the overlapping area SA2 (see FIG. 4), the printing rate R2 linearly decreases toward an upstream side (a lower side in FIG. 7B) in the conveying direction AR. In the range in the conveying direction AR corresponding to the overlapping area SA2, the printing rate R3 linearly decreases toward a downstream side (an upper side in FIG. 7B) in the conveying direction AR. In the range in the conveying direction AR corresponding to the overlapping area SA2 (see FIG. 4), a sum of the printing rate R2 and the printing rate R3 is 100%. This also applies to the printing rates R3 and R4 in the range in the conveying direction AR corresponding to the overlapping area SA3 (see FIG. 4).

In FIG. 7B, the printing rates are shown only for the partial printings in the head positions P2 to P4. However, the printing rates are similar, also in the other head positions P1 and P5. Thereby, in each of the non-overlapping areas NA1 to NA5 and the overlapping areas SA1 to SA4, the printing is possible with the printing rate of 100%.

The distribution pattern data PD is generated so that the above-described printing rates are to be implemented in correspondence to positions in the conveying direction AR in the overlapping areas.

In S220, the CPU 310 distributes and stores the dot data of the notice rasterization line in the output buffer and the primary saving buffer, according to the distribution pattern data PD. That is, data, which indicates dots that are to be formed by the notice partial printing, of the dot data of the notice rasterization line is stored in the output buffer, and data, which indicates dots that are to be formed by the partial printing after the notice partial printing, is stored in the primary saving buffer.

In S230, the CPU 310 determines whether the rasterization lines of the notice partial printing have been all processed as the notice rasterization line. For example, in a case in which the partial printing SP1 to be executed in the head position P1 of FIG. 4 is the notice partial printing, when the rasterization line RL3, which is located on the most upstream side in the conveying direction AR, of the plurality of rasterization lines RL corresponding to the head position P1 is the notice rasterization line, it is determined that the rasterization lines of the notice partial printing have been all processed.

When it is determined that the rasterization lines of the notice partial printing have been all processed (S230: YES), the dot data of the notice partial printing is stored in the output buffer at this point of time. Therefore, in this case, in S235, the CPU 310 outputs the dot data of the notice partial printing to the printing mechanism 100, as the partial printing data. At this time, the partial printing data to be output is added with control data, which indicates an amount of conveyance of the sheet conveyance T to be executed after the notice partial printing. For example, it is assumed that the notice partial printing is the first partial printing SP1. In this case, a length in the conveying direction AR of the overlapping area SA1 on the upstream side of the partial area RA1 to be printed by the partial printing SP1 is Ha (see FIG. 4). Therefore, the amount of conveyance of the sheet conveyance T to be executed after the notice partial printing is a value (D-Ha) obtained by subtracting the length Ha from the nozzle length D.

In S240, the CPU 310 deletes the output partial printing data from the output buffer, and copies the data stored in the primary saving buffer to the output buffer. For example, at the point of time at which the final rasterization line corresponding to the head position P1 of FIG. 4 has been processed, the rasterization lines, which are in the overlapping area SA1, of the plurality of rasterization lines corresponding to the head position P2 have been already processed. Data, which is used in the partial printing SP2 to be executed in the head position P2, of the rasterization data corresponding to the processed rasterization lines is already stored in the primary saving buffer. In S240, the data is copied to the output buffer.

When it is determined that there is a rasterization line, which is not processed yet, of the notice partial printing (S230: NO), the CPU 310 skips over S235 and S240.

In S245, the CPU 310 determines whether all the rasterization lines in the print image PI have been processed as the notice rasterization line. When it is determined that there is a rasterization line not processed yet (S245: NO), the CPU 310 returns to S200, and selects the rasterization line not processed yet, as the notice rasterization line. When it is determined that all the rasterization lines have been processed (S245: YES), the CPU 310 ends the print data output processing.

A-4. Color Conversion Profile

Figure 8:
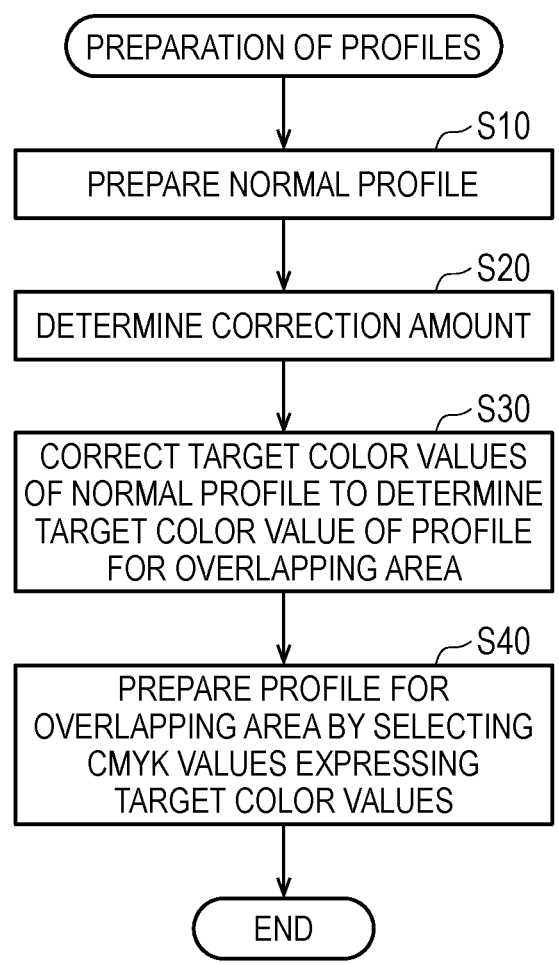
FIG. 8 is a flowchart of profile preparation.

The normal profile NP that is used in S222 of FIG. 5 and the profile OP for overlapping area that is used in S310 of FIG. 6 are described. FIG. 8 is a flowchart of profile preparation. The profile is prepared by the manufacturer of the printer 200 upon development of the printer 200, for example.

In S10, the preparer prepares the normal profile NP. The normal profile NP is prepared so as to optimize a color of an image to be printed in the non-overlapping area NA, i.e., an image (also referred to as one-pass image) to be printed by single partial printing SP.

For example, the normal profile NP is prepared by the manufacture of the printer 200, as follows. The preparer sets a target color value TC to be expressed, for each of a plurality of representative values GV (grid values) of the RGB values. The plurality of representative values GV is 729 ($9^3$) RGB values obtained by setting each value of R, G and B to any one of nine specific values (0, 32, 64, 96, 128, 160, 192, 224, 255) substantially equally set between 0 and 255 in a RGB color space.

The target color value TC is, for example, indicated by a color value (also referred to as Lab value) of a CIELAB color space, which is a device-independent color space. Also, the preparer prints a plurality of patches through the single partial printing SP by using the printer 200, based on the plurality of CMYK values. The preparer measures colors of the plurality of patches by a colorimeter, thereby obtaining Lab values indicative of the colors of the respective patches. The preparer determines a correspondence relation between the CMYK values and the Lab values, based on the Lab values of the respective patches. The preparer determines the CMYK values corresponding to the target color values TC (Lab values) of the representative values GV of the RGB values, based on the correspondence relation. The preparer prepares, as the normal profile NP, a look-up table indicating the correspondence relation between the plurality of representative values GV of the RGB values and the CMYK values corresponding to the plurality of representative values GV.

In S20 to S40, the preparer prepares a profile OP for overlapping area. The profile OP for overlapping area is prepared so as to optimize a color of an image to be printed in the overlapping area SA, i.e., an image (also referred to as two-pass image) to be printed by the two partial printings SP.

In S20, the preparer determines a correction amount ΔL of an L value for each color. For example, the preparer prints a solid image of the same color on the image data in such an aspect including the overlapping area SA and the non-overlapping area NA, like the print image PI of FIG. 4, with respect to diverse colors. In the print image, a correction amount ΔL of an L value is determined for each color, based on a density difference between the overlapping area SA and the non-overlapping area NA.

Herein, when an image of the same color on the image data is printed, a density difference may occur between the overlapping area SA and the non-overlapping area NA. The reason is estimated as follows, although it is not clear. In the non-overlapping area NA, a total amount of ink is ejected on the sheet M by the single partial printing. In contrast, in the overlapping area SA, a half amount of ink is ejected on the sheet M by the first partial printing, and a half amount of ink is then ejected on the sheet M by the second partial printing after time necessary to convey the sheet M has elapsed. For this reason, it is considered that a density difference occurs between the overlapping area SA and the non-overlapping area NA due to differences of aspects in which the ink permeates into the sheet M, aspects in which the ink spreads on the sheet M, and the like. For example, when an image of the same color on the image data is printed, if a density of color to be printed in the overlapping area SA is higher than a density of the color to be printed in the non-overlapping area NA, the correction amount ΔL corresponding to the color is determined as a value of lowering the density. Since the L value indicates brightness, the density decreases as the L value increases. Therefore, the correction amount ΔL of lowering the density has a positive value.

Also, characteristics vary, depending on types of the ink. Also, the sensitivity in density difference due to human vision varies, depending on hue and saturation. For this reason, whether the density difference between the overlapping area SA and the non-overlapping area NA is noticeable is different depending on colors. For this reason, in the first illustrative embodiment, the correction amount ΔL that is different for each color is experimentally determined.

Figure 9A:
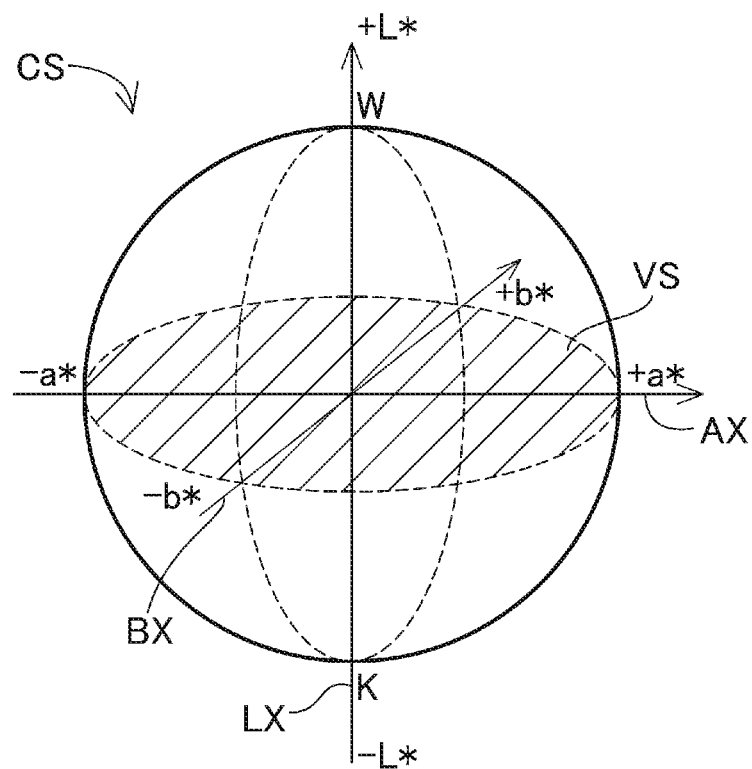
FIGS. 9A and 9B are first illustration views of a correction amount ΔL.

FIGS. 9 and 10 illustrate the correction amount ΔL of the first illustrative embodiment. FIG. 9A depicts conceptually a CIELAB color space CS. In FIG. 9A, an axis LX extending in the vertical direction is an axis corresponding to component values L* (hereinbelow, referred to as L value) indicative of brightness. Two axes AX and BX perpendicular to the axis LX and perpendicular to each other are respectively axes corresponding to component values a* (hereinbelow, referred to as 'a value') and b* (hereinbelow, referred to as 'b value') relating to color tone (saturation or hue). Since a color of a*=b*=0 is an achromatic color, the axis LX is an achromatic axis. As the 'a value' increases toward the positive direction, red increases, and as the 'a value' increases toward the negative direction, green increases. Also, as the 'b value' increases toward the positive direction, yellow increases, and as the 'b value' increases toward the negative direction, blue increases.

In FIG. 9A, for easy understanding, the CIELAB color space CS is entirely shown as a sphere. However, a color area that can be actually expressed in the CIELAB color space CS by the printer 200 has a shape different from the sphere.

Figure 9B:
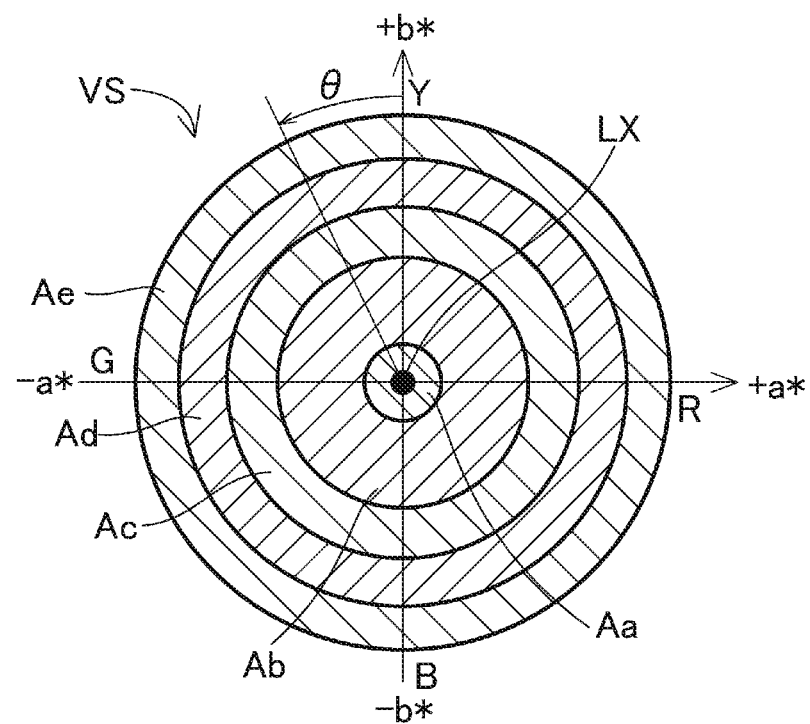

FIG. 9B depicts a sectional view VS of the CIELAB color space CS, which is a plane in which the L value is 0, i.e., a plane perpendicular to the axis LX and passing an origin (L*,a*,b*)=(0, 0, 0). As shown in FIGS. 9A and 9B, five areas Aa to Ae are defined in the CIELAB color space CS, in correspondence to distances DT to the axis LX.

Figure 10A:
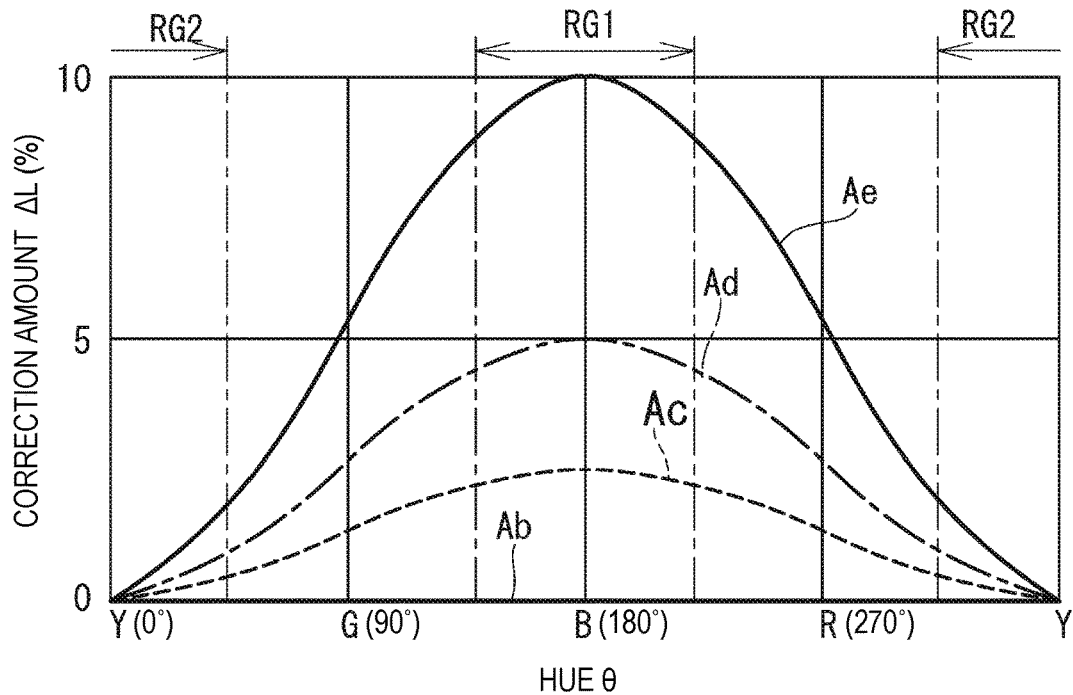
FIGS. 10A and 10B are second illustration views of the correction amount ΔL.

Area Aa: 0≤DT<Th1
Area Ab: Th1≤DT<Th2
Area Ac: Th2≤DT<Th3
Area Ad: Th3≤DT<Th4
Area Ae: Th5≤DT The area Aa is an area including the achromatic axis LX, and is also referred to as 'achromatic area'. The areas Ad to Ae are areas more distant from the achromatic axis LX than the area Aa, and are also referred to as 'chromatic area'. FIG. 10A depicts the correction amounts ΔL corresponding to colors (Lab values) included in each of the chromatic areas Ab to Ae. In the graph of FIG. 10A, the horizontal axis indicates the hues θ, and the vertical axis indicates the correction amounts ΔL. The hue θ is shown in a circumferential position about the achromatic axis LX in the CIELAB color space CS, and takes a value in a range from 0° to 360°. When a position of yellow (Y) (a position in the +B* direction) is taken as a position of 0°, positions of green (G), blue (B) and red (R) are positions of 90°, 180° and 270°, respectively.

In the chromatic area Ab, the correction amount ΔL is zero (0), irrespective of the hue θ. In the chromatic areas Ac to Ae, the correction amount ΔL is different, in correspondence to the hue θ. Specifically, in the chromatic areas Ac to Ae, the correction amount ΔL is greatest when the hue θ is B (180°), and is smallest when the hue θ is Y (0°).

In the chromatic areas Ac to Ae, the correction amount ΔL decreases as the hue θ moves from B (180°) toward Y (0°). In the chromatic areas Ac to Ae, the correction amount ΔL is about a half of the maximum value when the hue θ is G (90°) and R (270°). In the chromatic areas Ac to Ae, the minimum value of the correction amount ΔL (i.e., the correction amount ΔL when the hue is Y) is zero (0). Thus, the minimum value of the correction amount ΔL (i.e., the correction amount ΔL when the hue θ is Y) is zero (0). In the chromatic areas Ac to Ae, the maximum value of the correction amount ΔL (i.e., the correction amount ΔL when the hue θ is B) increases in the area more distant from the achromatic axis LX. For example, in the example of FIG. 10A, in the chromatic areas Ac, Ad and Ae, when the hue θ is B, the correction amount ΔL is about 2.5%, 5% and 10%, respectively.

Figure 10B:
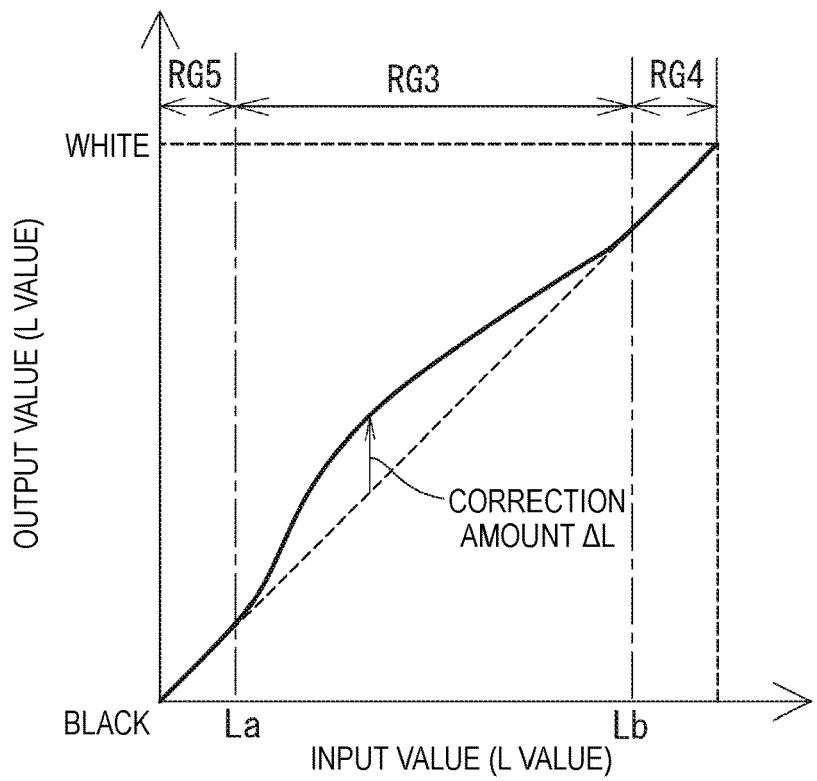

FIG. 10B depicts the correction amounts ΔL of the L values corresponding to the colors (Lab values) included in the achromatic area Aa. In the graph of FIG. 10B, the horizontal axis indicates input values of the L value, and the vertical axis indicates output values of the L value. In the graph of FIG. 10B, a difference between the output value and the input value indicates the correction amount ΔL. As shown in FIG. 10A, in the achromatic area Aa, the correction amount ΔL is different, in correspondence to the L value (L*). Specifically, in a low brightness range in which a relation of La≥L* is satisfied, i.e., in a low brightness range including black (K), the correction amount ΔL is 0. In a high brightness range in which a relation of Lb≤L* is satisfied, i.e., in a high brightness range including white (W), the correction amount ΔL is 0. In an intermediate brightness range in which a relation of La<L*<Lb is satisfied, the correction amount ΔL is a positive value. The correction amount ΔL is greatest in the vicinity of the center of the high brightness range, and becomes smaller toward the low brightness range and toward the high brightness range.

In S30, the preparer corrects the target color values TC (Lab values) of the representative values GV of the plurality of RGB values of the normal profile, and determines target color values TCo of the representative values GV of the profile OP for overlapping area. The representative values GV of the profile OP for overlapping area are the same as the representative values GV of the normal profile, and are, for example, the 729 RGB values. The correction amounts ΔL of the respective target color values TC are the correction amounts determined in S20, and are as shown in FIGS. 9 and 10. A correction target of the three component values (L value, a value, and b value) of the target color value TC is only the L value, and the 'a value' and the 'b value' are not corrected. Therefore, in the target color values TCo after correction, the hue is maintained and the brightness is changed, as compared to the target color values TC before correction.

In S40, for each of the plurality of representative values GV of the profile OP for overlapping area, the preparer selects the CMYK values for expressing the target color value TCo of the representative value GV, as the CMYK values associated with the representative value GV. Thereby, the look-up table, which indicates the correspondence relation between the plurality of representative values GV of the RGB values and the CMYK values corresponding to each of the plurality of representative values GV, is prepared as the profile OP for overlapping area. The CMYK values for expressing the target color value TCo are selected, based on the correspondence relation between the CMYK values and the Lab values, which are determined so as to prepare the normal profile NP.

According to the first illustrative embodiment as described above, the CPU 310 obtains, as the target image data, the RGB image data (S10 and S20 in FIG. 1). The CPU 310 generates the dot data, which indicates the dot formation state for each pixel, by using the RGB image data (S210 to S225 in FIG. 5). The CPU 310 causes the printer 200 (the printing mechanism 100) as the print execution device to execute more than once alternately the partial printing SP and the conveyance of the sheet M by the conveyor 140 by using the dot data, thereby printing the print image PI (S235 in FIG. 5). For example, the CPU 310 causes the printer 200 to execute the first partial printing SP1, to convey the sheet M by the specific amount of conveyance (D-Ha) after the first partial printing SP1, and then to execute the second partial printing SP2.

In the first partial printing SP1, the dots are printed in the overlapping area SA1, which includes the upstream end in the conveying direction AR, of the partial area RA1 capable of being printed by the first partial printing SP1 and in the non-overlapping area NA1, which is on the more downstream side than the overlapping area SA1 in the conveying direction AR, of the partial area RA1 (see FIG. 4). In the first partial printing SP1, no dot is formed in the non-overlapping area NA2, which is on the more upstream side than the overlapping area SA1 in the conveying direction AR, of the partial area RA2. In the second partial printing SP2, the dots are formed in the overlapping area SA1 and the non-overlapping area NA2 of the partial area RA2, and no dot is formed in the non-overlapping area NA1 of the partial area RA1. The CPU 310 executes the dot data generation processing for non-overlapping area (S222 and S224 in FIG. 5) on data (also referred to as 'non-overlapping area data'), which corresponds to the non-overlapping area NA1, of the RGB image data, thereby generating data, which corresponds to the non-overlapping area NA1, of the dot data. The CPU 310 executes the dot data generation processing for overlapping area (S212 in FIG. 5, and FIG. 6) on data (also referred to as 'overlapping area data'), which corresponds to the overlapping area SA1, of the RGB image data, thereby generating data, which corresponds to the overlapping area SA1, of the dot data.

The overlapping area processing includes processing in which the correction amount ΔL is different in each range of the values of pixels (RGB values). For example, in each of the chromatic areas Ac to Ad, the correction amount ΔL is larger in processing that is executed for values of pixels in a range RG1 about blue (B) (see FIG. 10A) than in processing that is executed for values of pixels in a range RG2 about yellow (Y) (see FIG. 10A). Also, in the achromatic area Aa, the correction amount ΔL is larger than zero (0) in processing that is executed for values of pixels in a range RG3 including white (W) and black (K) (e.g., about gray) (see FIG. 10B), and the correction amount ΔL is zero (0) in processing that is executed for values of pixels in ranges RG4 and RG5 including white (W) and black (K) (e.g., about white and black, respectively) (see FIG. 10B). Like this, the processing that is executed for the values of pixels in the range RG1 is different from the processing that is executed for the values of pixels in the range RG2. Also, the processing that is executed for the values of pixels in the range RG3 is different from the processing that is executed for the values of pixels in the ranges RG4 and RG5. In the processing that is executed for the values of pixels in the ranges RG1 and RG3, the correction amount ΔL is a positive value. That is, the processing that is executed for the values of pixels in the ranges RG1 and RG3 includes processing (also referred to as 'first density lowering processing') of lowering a density of an image to be printed in the overlapping area SA, as compared to if the dot data generation processing for non-overlapping area was executed for the overlapping area data.

As a result, it is possible to execute the appropriate processing for the values of pixels in the ranges RG1 and RG3 and the values of pixels in the ranges RG2, RG4 and RG5. As a result, even when the colors in the ranges RG1 and RG3 exist in the overlapping area SA1, and even when the colors in the ranges RG2, RG4 and RG5 exist in the overlapping area SA1, it is possible to efficiently suppress color variation between the non-overlapping area NA1 and the overlapping area SAE For example, in FIG. 10A, in a case in which the correction amount ΔL for the values of pixels in the range RG1 is the same as the correction amount ΔL for the values of pixels in the range RG2, even if the color variation can be suppressed when a color of an image including the non-overlapping area NA1 and the overlapping area SA1 is blue (B), the color variation occurs when a color of the image including the non-overlapping area NA1 and the overlapping area SA1 is yellow (Y). Alternatively, even if the color variation can be suppressed when a color of an image including the non-overlapping area NA1 and the overlapping area SA1 is yellow (Y), the color variation occurs when a color of the image including the non-overlapping area NA1 and the overlapping area SA1 is blue (B). Also, in FIG. 10B, in a case in which the correction amount ΔL for the values of pixels in the range RG3 and the correction amount ΔL for the values of pixels in the ranges RG4 and RG5 are all zero (0), even if the color variation can be suppressed when a color of an image including the non-overlapping area NA1 and the overlapping area SA1 is white or black, the color variation occurs when a color of the image including the non-overlapping area NA1 and the overlapping area SA1 is gray different from white and black. According to the first illustrative embodiment, it is possible to suppress such problems.

In the first illustrative embodiment, in the processing for the values of pixels in the ranges RG4 and RG5, the correction amount ΔL is zero (0), as described above (see FIG. 10B). That is, the processing for the values of pixels in the ranges RG4 and RG5 does not include the processing of lowering the density of the image to be printed in the overlapping area SA. Herein, it can be said that the processing in which the correction amount ΔL is zero (0) is processing of setting the density of the image, which is to be printed in the overlapping area SA, to be the same as the case in which the dot data generation processing for non-overlapping area is executed on the overlapping area data. As a result, in the dot data generation processing for overlapping area, it is possible to execute the appropriate processing for the values of pixels in the range RG3 and the values of pixels in the ranges RG4 and RG5.

Also, in the processing for the values of pixels in the range RG2, as described above, the correction amount ΔL is smaller than the correction amount ΔL for the values of pixels in the range RG1 (see FIG. 10A). That is, the processing for the values of pixels in the range RG2 lowers the density of the image, which is to be printed in the overlapping area SA, as compared to a case in which the dot data generation processing for non-overlapping area is executed on the overlapping area data, but is processing (also referred to as 'second density lowering processing') in which a degree of lowering in density is less than in the first density lowering processing for the values of pixels in the range RG1. As a result, in the dot data generation processing for overlapping area, it is possible to execute the appropriate processing for the values of pixels in the range RG1 and the values of pixels in the range RG2.

Also, in the first illustrative embodiment, the range RG1 includes a first color (for example, blue or purple) that is expressed using cyan and magenta inks without using yellow ink. The range RG2 includes a second color (for example, yellow or orange) that is expressed using yellow ink without using at least one of cyan ink and magenta ink. In a case in which the printing is performed through the two partial printings SP, it is experimentally confirmed that the first color (for example, blue or purple) that is expressed using cyan and magenta inks without using yellow ink has a greater degree of increase in density than the second color (for example, yellow or orange) that is expressed using yellow ink without using at least one of cyan ink and magenta ink. In the first illustrative embodiment, it is possible to execute the appropriate processing for the values of pixels of the first color and the values of pixels of the second color, considering such a characteristic.

Also, in the first illustrative embodiment, the range RG3 includes a color, which has a density (a density corresponding to brightness of La<L*<Lb) in a specific range in which black and white are not included, of achromatic colors. The range RG3 includes a color, which has a density (a density corresponding to brightness of L*≤La, Lb≤L*) outside of the specific range, of achromatic colors. In a case in which the printing is performed through the two partial printings SP, it is experimentally confirmed that a color (for example, gray), which has a density (a density corresponding to brightness of L*≤La, Lb≤L*) within the specific range in which black and white are not included, of achromatic colors has a greater degree of increase in density than a color (for example, white or black), which has a density outside of the specific range, of achromatic colors. In the first illustrative embodiment, it is possible to execute the appropriate processing for the values of pixels of a color, which has a density within the specific range in which black and white are not included, of achromatic colors and the values of pixels of a color, which has a density outside of the specific range, of achromatic colors, considering such a characteristic.

Also, in the first illustrative embodiment, the CPU 310 determines whether the data of the notice rasterization line of the RGB image data is the non-overlapping area data corresponding to the non-overlapping area NA or the overlapping area data corresponding to the overlapping area SA (S210 in FIG. 5). When it is determined that the data of the notice rasterization line is the non-overlapping area data (S210: NO), the CPU 310 executes the dot data generation processing for non-overlapping area, which includes the color conversion processing (S222 in FIG. 5) in which the normal profile NP is used, on the corresponding data (S222 and S224 in FIG. 5). When it is determined that the data of the notice rasterization line is the overlapping area data (S210: YES), the CPU 310 executes the dot data generation processing for overlapping area, which includes the color conversion processing (S310 in FIG. 6) in which the profile OP for overlapping area is used, on the corresponding data (S212 in FIG. 5). In this way, since the profile OP for overlapping area different from the normal profile NP is used for the overlapping area data, it is possible to easily execute the appropriate processing for the values of pixels in the ranges RG1 and RG3 and the values of pixels in the ranges RG2, RG4 and RG5 in the dot data generation processing for overlapping area, for example.

Also, in the first illustrative embodiment, the target image data is the RGB image data in which color of each pixel is expressed by the color values (RGB values) of the RGB color coordinate system, and the normal profile NP and the profile OP for overlapping area are respectively a profile of defining the correspondence relation between the color values of the RGB color coordinate system and the color values (CMYK values) of the CMYK color coordinate system including a plurality of components corresponding to a plurality of types of inks to be used for printing by the printer 200. The color conversion processing in S222 of FIG. 5 and S310 of FIG. 6 is processing of converting the color values of the RGB color coordinate system included in the data of the notice rasterization line into the color values of the CMYK color coordinate system. For example, when generating the dot data by using the RGB image data, it is necessary to execute processing of converting the color values of the RGB color coordinate system into the color values of the CMYK color coordinate system. According to the first illustrative embodiment, the profile OP for overlapping area is prepared separately from the normal profile NP, so that it is possible to execute the appropriate processing for the values of pixels in the ranges RG1 and RG3 and the values of pixels in the ranges RG2, RG4 and RG5 in the color conversion processing, without adding extra processing.

Also, according to the first illustrative embodiment, the device configured to execute the image processing of FIG. 4 is the terminal apparatus 300 that is a separate apparatus from the printer 200. As a result, for example, when the computer program PG1, the normal profile NP and the profile OP for overlapping area are installed in the terminal apparatus 300, it is possible to suppress the color variation between the overlapping area SA and the non-overlapping area NA, without particularly changing the printer 200.

As can be seen from the descriptions above, the normal profile NP is an example of a first profile, and the profile OP for overlapping area is an example of a second profile. Also, the RGB color coordinate system is an example of a first color coordinate system, and the CMYK color coordinate system is an example of a second color coordinate system. Also, the range RG1 and the range RG3 are examples of a first range, and the ranges RG2, RG4 and RG5 are examples of a second range.

B. Second Illustrative Embodiment

In a second illustrative embodiment, in the non-volatile storage device 320, a correction profile (not shown) of RGB values is stored, instead of the profile OP for overlapping area. The correction profile of RGB values is a profile of defining a correspondence relation between RGB values before correction and RGB values after correction so as to correct brightness of the RGB values before correction by the correction amount ΔL shown in FIGS. 10A and 10B, in correspondence to a color indicated by the RGB values. The RGB values are corrected with reference to the correction profile, so that the RGB values are corrected to RGB values indicative of a color of which a density is lowered by the correction amount ΔL.

Figure 11:
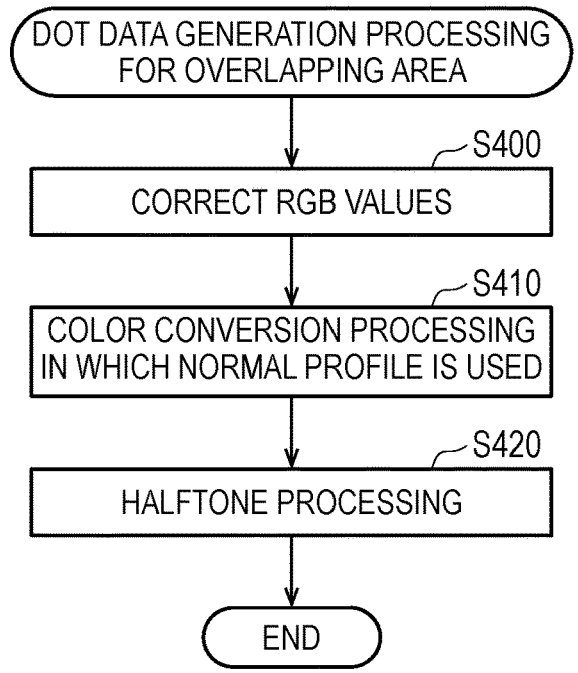
FIG. 11 is a flowchart of dot data generation processing for overlapping area of a second illustrative embodiment.

In the second illustrative embodiment, the dot data generation processing for overlapping area in S212 of FIG. 5 is different from the dot data generation processing for overlapping area (see FIG. 6) of the first illustrative embodiment. FIG. 11 is a flowchart of the dot data generation processing for overlapping area of the second illustrative embodiment. In S400, the CPU 310 corrects the RGB values of each pixel of the data of the notice rasterization line with reference to the above-described correction profile of RGB values. In S410, the CPU 310 executes the color conversion processing, in which the normal profile NP is used, on the corrected data of the notice rasterization line. Thereby, the RGB values of each pixel of the corrected data of the notice rasterization line are converted into CMYK values. In S420, the halftone processing is executed on the data of the notice rasterization line subjected to the color conversion processing. Thereby, the dot data of the notice rasterization line is generated.

According to the second illustrative embodiment as described above, the CPU 310 determines whether the data of the notice rasterization line of the RGB image data is the non-overlapping area data corresponding to the non-overlapping area NA or the overlapping area data corresponding to the overlapping area SA (S210 in FIG. 5). When it is determined that the data of the notice rasterization line is the overlapping area data (S210: YES), the CPU 310 executes the dot data generation processing for overlapping area (see FIG. 11), which includes the correction processing of RGB values (S400 in FIG. 11), on the corresponding data. When it is determined that the data of the notice rasterization line is the non-overlapping area data (S210: NO), the CPU 310 executes the dot data generation processing for non-overlapping area (see FIG. 11), which does not include the correction processing of RGB values, on the corresponding data (S222 and S224 in FIG. 5). In this way, since the dot data generation processing for overlapping area including the correction processing of RGB values is executed, it is possible to execute the appropriate processing for the values of pixels in the ranges RG1 and RG3 and the values of pixels in the ranges RG2, RG4 and RG5 in the dot data generation processing for overlapping area.

C. Third Illustrative Embodiment

In a third illustrative embodiment, in the non-volatile storage device 320, a correction profile (not shown) of CMYK values is stored, instead of the profile OP for overlapping area. The correction profile of CMYK values is a profile of defining a correspondence relation between CMYK values before correction and CMYK values after correction so as to correct brightness of the CMYK values before correction by the correction amount ΔL shown in FIGS. 10A and 10B, in correspondence to a color indicated by the CMYK values. The CMYK values are corrected with reference to the correction profile, so that the CMYK values are corrected to CMYK values indicative of a color of which a density is lowered by the correction amount ΔL.

Figure 12:
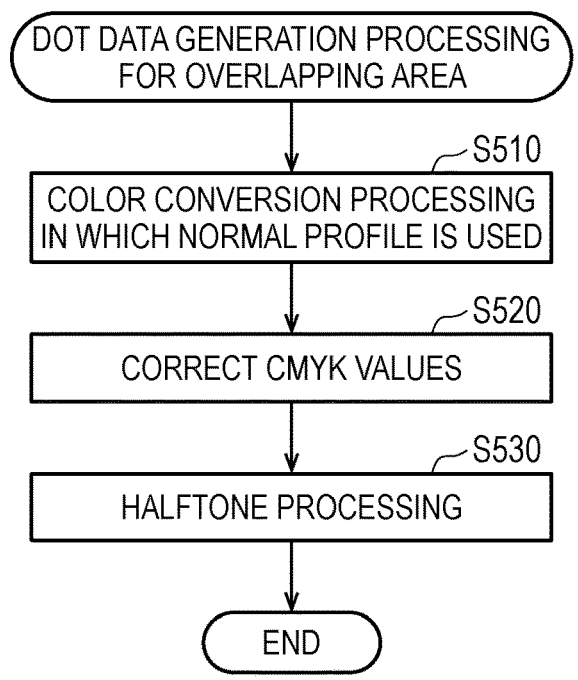
FIG. 12 is a flowchart of dot data generation processing for overlapping area of a third illustrative embodiment.

In the third illustrative embodiment, the dot data generation processing for overlapping area in S212 of FIG. 5 is different from the dot data generation processing for overlapping area of the first illustrative embodiment (see FIG. 6). FIG. 12 is a flowchart of the dot data generation processing for overlapping area of the third illustrative embodiment. In S510, the CPU 310 executes the color conversion processing, in which the normal profile NP is used, on the data of the notice rasterization line. Thereby, the RGB values of each pixel of the data of the notice rasterization line are converted into CMYK values. In S520, the CMYK values of each pixel of the data of the notice rasterization line subjected to the color conversion processing are corrected with reference to the correction profile of CMYK values. In S530, the halftone processing is executed on the corrected data of the notice rasterization line. Thereby, the dot data of the notice rasterization line is generated.

According to the third illustrative embodiment as described above, the CPU 310 determines whether the data of the notice rasterization line of the RGB image data is the non-overlapping area data corresponding to the non-overlapping area NA or the overlapping area data corresponding to the overlapping area SA (S210 in FIG. 5). When it is determined that the data of the notice rasterization line is the overlapping area data (S210: YES), the CPU 310 executes the dot data generation processing for overlapping area (see FIG. 12), which includes the correction processing of CMYK values (S520 in FIG. 12) to be executed after the color conversion processing, on the corresponding data. When it is determined that the data of the notice rasterization line is the non-overlapping area data (S210: NO), the CPU 310 executes the dot data generation processing for non-overlapping area, which does not include the correction processing of CMYK values, on the corresponding data (S222 and S224 in FIG. 5). In this way, since the dot data generation processing for overlapping area including the correction processing of CMYK values is executed, it is possible to execute the appropriate processing for the values of pixels in the ranges RG1 and RG3 and the values of pixels in the ranges RG2, RG4 and RG5 in the dot data generation processing for overlapping area.

D. Modification to Illustrative Embodiments (1) The dot data generation processing for overlapping area in each illustrative embodiment is exemplary, and the present disclosure is not limited thereto. For example, in the dot data generation processing for overlapping area of FIG. 12, the CPU 310 may execute the halftone processing in S530 so as to lower the density by the correction amount ΔL without executing the correction processing of CMYK values in S520.

For example, in a case in which halftone processing of using a dither matrix is adopted as the halftone processing, the CPU 310 may increase each threshold value defined in the dither matrix by an amount corresponding to the correction amount ΔL, for example. Thereby, since a probability of occurrence of dots is reduced, the density can be reduced by the correction amount ΔL. Alternatively, in a case in which halftone processing of using an error diffusion method is adopted as the halftone processing, the CPU 310 may increase a relative density value used in the error diffusion method, i.e., a value indicative of a density to be expressed by one dot by an amount corresponding to the correction amount ΔL. Thereby, since a probability of occurrence of dots is reduced, the density can be reduced by the correction amount ΔL.

(2) In the dot data generation processing for overlapping area of FIG. 12, the CPU 310 may execute the halftone processing to generate the dot data in S530, and then execute correction processing of lowering the density by the correction amount ΔL on the generated dot data, without executing the correction processing of CMYK values in S520. The correction processing on the dot data may be processing of thinning out dots at a predetermined ratio or processing of reducing a dot size at a predetermined ratio (for example, processing of changing a large dot into a small dot), for example.

(3) The correction amount ΔL shown in FIGS. 10A and 10B is exemplary and the present disclosure is not limited thereto. For instance, in the example of FIGS. 10A and 10B, for both the chromatic areas Ab to Ae and the achromatic area Aa, the correction amount ΔL greater than zero (0) is set for at least some colors. Instead of this configuration, only for the chromatic areas Ab to Ae, the correction amount ΔL shown in FIG. 10A may be set, and for the achromatic area Aa, the correction amount ΔL may be set to zero (0).

Also, for the chromatic areas Ab to Ae, the correction amount ΔL may be set to zero (0), and only for the achromatic area Aa, the correction amount ΔL shown in FIG. 10B may be set. Also, in a case in which monochrome printing, in which only black (K) ink is used, is executed in the printer 200, since the color to be printed is only an achromatic color, the correction amount ΔL shown in FIG. 10B may be set only for the achromatic color.

Also, the density may be more lowered in the printing by the two partial printings than in the printing by the single partial printing, depending on a combination of the type of the sheet M and the type of the ink, for example, for some colors. In this case, the correction amount ΔL of increasing the density, i.e., the negative correction amount ΔL may be set for some colors.

(4) As the printing medium, instead of the sheet M, other media such as an OHP film, a CD-ROM, and a DVD-ROM may be adopted.

(5) In the printing mechanism 100 of the above illustrative embodiments, the conveyor 140 conveys the sheet M to relatively move the sheet M relative to the print head 110 in the conveying direction. Instead of this configuration, the sheet M may be relatively moved relative to the print head 110 in the conveying direction AR by moving the print head 110 relative to the fixed sheet M in an opposite direction to the conveying direction AR.

(6) In the respective illustrative embodiments, the device configured to execute the image processing of FIG. 3 is the terminal apparatus 300. Instead, the CPU 210 of the printer 200 may be configured to execute the image processing of FIG. 3. That is, the device configured to execute the image processing of FIG. 3 may be a device including the printing mechanism 100 as the print execution device. In this case, the CPU 210 functioning as the control device outputs the partial printing data to a predetermined memory area of the non-volatile storage device 220 or the volatile storage device 230, in S50 of FIG. 3. The printing mechanism 100 of the printer 200 executes the partial printing, according to the partial printing data output to the memory area. According to this modified illustrative embodiment, the terminal apparatus 300 is not required, and the printer 200 is a single body and can suppress the color variation between the overlapping area SA and the non-overlapping area NA.

As can be seen from the descriptions above, in the respective illustrative embodiments, the terminal apparatus 300 is an example of a control device, and the printer 200 is an example of a print execution device. In this modified illustrative embodiment, the CPU 210 of the printer 200 is an example of the control device, and the printing mechanism 100 of the printer 200 is an example of the print execution device.

(7) The device configured to execute the image processing of FIG. 3 may be a server configured to obtain image data from the printer or the terminal apparatus and to generate a print job by using the image data. The server may be a plurality of calculators capable of performing communication each other via the network. In this case, the entirety of the plurality of calculators capable of performing communication each other via the network is an example of the image processing apparatus.

(8) In the respective illustrative embodiments, some of the configurations implemented by hardware may be replaced with software, and some or all of the configurations implemented by software may be replaced with hardware. For example, in a case in which the image processing shown in FIG. 3 is executed in the printer 200, the halftone processing and the color conversion processing may be implemented by a dedicated hardware circuit (for example, ASIC) configured to operate in response to an instruction from the CPU 210.

(9) The dot data generation processing for overlapping area in each illustrative embodiment is exemplary, and the present disclosure is not limited thereto. For example, the color conversion processing, in which the profile OP for overlapping area is used, may be executed only on data corresponding to center area of the overlapping area SA in the moving direction AR. In this case, with respect to area other than such partial area (e.g., an overlapping area SA except the center area thereof and the non-overlapping area), the color conversion processing, in which the normal profile NP is used, is executed on data corresponding thereto.

According thereto, by executing the color conversion processing, in which the profile OP for overlapping area is used, on the data corresponding to even a part of the overlapping area SA, it is possible to suppress the color variation in the overlapping area SA, as compared to if the color conversion processing, in which the normal profile NP is used, was executed thereon.

(10) The color conversion processing, in which the profile OP for overlapping area is used, may be executed on data corresponding to the overlapping area SA and a part of area of the partial area RA adjacent to the overlapping area. In this case, with respect to area of the partial area RA other than the above-explained part of area adjacent to the overlapping area, the color conversion processing, in which the normal profile NP is used, is executed on data corresponding thereto.

According thereto, the color conversion processing, in which the common profile OP for overlapping area, is executed not only on the data corresponding to the overlapping area SA but also on the data corresponding to the part of area adjacent to the overlapping area. Therefore, it is possible to suppress a color difference at a boundary between the overlapping area and the partial area, as compared to a case in which different color conversion processings are executed on respective data of the overlapping area and the partial area.

Although the present disclosure has been described with reference to the illustrative embodiments and the modified illustrative embodiments, the illustrative embodiments of the present disclosure are provided so as to easily understand the present disclosure, not to limit the present disclosure. The present disclosure can be changed and improved without departing from the scope thereof, and includes equivalents thereof.

What is claimed is:

1. A control device for controlling a print execution device, the print execution device comprising a print head having a plurality of nozzles configured to eject ink, a head driver configured to cause the print head to eject the ink to form dots on a printing medium, and a mover configured to move the printing medium relative to the print head in a moving direction, the control device being configured to:
   obtain target image data;
   generate dot data indicating a formation state of the dots for each pixel using the target image data; and
   control the print execution device to print a print image using the dot data by alternately executing a partial printing of controlling the print head to form the dots and a moving of controlling the mover to move the printing medium for plural times,
   wherein in the controlling of the print execution device, the control device is configured to:
      control the print execution device to execute a first partial printing;
      control the mover to move the printing medium by a specific moving amount after the first partial printing; and
      control the print execution device to execute a second partial printing after moving the printing medium by the specific moving amount,
      in the first partial printing, the control device being configured to control the print head to:
         form the dots in an overlapping area and a first non-overlapping area, the overlapping area including an upstream end of an area printable by the first partial printing with respect to the moving direction, the first non-overlapping area being a non-overlapping area different from the overlapping area and located downstream of the overlapping area of the area printable by the first partial printing with respect to the moving direction; and
         not to form the dots in a second non-overlapping area, the second non-overlapping area being a non-overlapping area located upstream of the overlapping area of an area printable by the second partial printing with respect to the moving direction, and
      in the second partial printing, the control device being configured to control the print head to:
         form the dots in the overlapping area and the second non-overlapping area; and
         not to form the dots in the first non-overlapping area,
   wherein in the generating of the dot data, the control device is configured to:
      generate first data of the dot data, the first data corresponding to the non-overlapping area, by executing non-overlapping area processing for non-overlapping area data of the target image data, the non-overlapping area data corresponding to the non-overlapping area; and
      generate second data of the dot data, the second data corresponding to the overlapping area, by executing overlapping area processing for overlapping area data of the target image data, the overlapping area processing being different from the non-overlapping area processing, the overlapping area data corresponding to the overlapping area,
   wherein the overlapping area processing includes:
      first processing to be executed for values of pixels within a first range; and
      second processing to be executed for values of pixels within a second range different from the first range, the second processing being different from the first processing; and
   wherein the first processing includes first density lowering processing of lowering a density of an image to be printed in the overlapping area, as compared to if the non-overlapping area processing was executed on the overlapping area data.

2. The control device according to claim 1, wherein the second processing is any one of:
   processing does not include processing of lowering the density of the image to be printed in the overlapping area, as compared to the case in which the non-overlapping area processing is to be executed on the overlapping area data; and
   processing including second density lowering processing of lowering the density of the image to be printed in the overlapping area, as compared to the case in which the non-overlapping area processing is to be executed on the overlapping area data, a degree of lowering the density being lower in the second density lowering processing than in the first density lowering processing.

3. The control device according to claim 2,
   wherein the print execution device is configured to form the dots by using a plurality of types of inks including cyan, magenta and yellow inks,
   wherein the first range includes a first color that is to be expressed using the cyan and magenta inks without using the yellow ink, and
   wherein the second range includes a second color that is to be expressed using the yellow ink without using at least one of the cyan and magenta inks.

4. The control device according to claim 2,
   wherein the first range includes a value indicating a first color of achromatic colors, the first color having a density within a specific range and without including black and white, and
   wherein the second range includes a value indicating a second color of the achromatic colors, the second color having a density outside of the specific range.

5. The control device according to claim 1, wherein in the generating of the dot data, the control device is configured to:
   determine whether notice data of the target image data is the non-overlapping area data or the overlapping area data;
   in a case it is determined that the notice data is the non-overlapping area data, execute the non-overlapping area processing including conversion processing using a first profile for the notice data; and in a case it is determined that the notice data is the overlapping area data, execute the overlapping area processing including conversion processing using a second profile on the notice data, the second profile being different from the first profile.

6. The control device according to claim 5, wherein the target image data is image data indicating a color for each pixel with a color value of a first color coordinate system, wherein the first profile and the second profile are respectively a profile of defining a correspondence relation between the color value of the first color coordinate system and a color value of a second color coordinate system including a plurality of components corresponding to a plurality of types inks to be used for printing by the print execution device, and wherein the conversion processings include processing of converting color values of the first color coordinate system included in the notice data into color values of the second color coordinate system.

7. The control device according to claim 1, wherein in the generating of the dot data, the control device is configured to:

determine whether notice data of the target image data is the non-overlapping area data or the overlapping area data;

in a case it is determined that the notice data is the overlapping area data, execute the overlapping area processing including specific conversion processing of correcting values of pixels included in the notice data; and in a case it is determined that the notice data is the non-overlapping area data, execute the non-overlapping area processing not including the specific correction processing.

8. The control device according to claim 7, wherein the target image data is image data indicating a color for each pixel with a color value of a first color coordinate system, wherein the non-overlapping area processing and the overlapping area processing include color conversion processing of converting color values of the first color coordinate system into color values of a second color coordinate system including a plurality of components corresponding to a plurality of types inks to be used for printing by the print execution device, and wherein the specific correction processing is any one of processing of correcting the color values of the first color coordinate system and processing of correcting the color values of the second color coordinate system.

9. A printer comprising:

a print execution device comprising:

a print head having a plurality of nozzles configured to eject ink;

a head driver configured to cause the print head to eject the ink to form dots on a printing medium; and a mover configured to move the printing medium relative to the print head in a moving direction; and the control device according to claim 1.

10. A non-transitory computer-readable medium storing a computer program readable by a computer configured to control a print execution device, the print execution device comprising a print head having a plurality of nozzles configured to eject ink, a head driver configured to cause the print head to eject the ink to form dots on a printing medium, and a mover configured to move the printing medium relative to the print head in a moving direction, the computer program, when executed by the computer, causes the computer to perform:

obtaining target image data;

generating dot data indicating a formation state of the dots for each pixel by using the target image data; and controlling the print execution device to print a print image using the dot data by alternately executing a partial printing of controlling the print head to form the dots and a moving of controlling the mover to move the printing medium, wherein in the controlling of the print execution device, the computer program further causes the computer to perform:

controlling the print execution device to execute a first partial printing;

controlling the mover to move the printing medium by a specific moving amount after the first partial printing; and controlling the print execution device to execute a second partial printing after moving the printing medium by the specific moving amount, in the first partial printing, the computer program causes the computer to control the print head to:

form the dots in an overlapping area and a first non-overlapping area, the overlapping area including an upstream end of an area printable by the first partial printing with respect to the moving direction, the first non-overlapping area being a non-overlapping area different from the overlapping area and located downstream of the overlapping area of the printable by the first partial printing with respect to the moving direction; and not to form the dots in a second non-overlapping area, the second non-overlapping area being a non-overlapping area located upstream of the overlapping area of an area printable by the second partial printing with respect to the moving direction, and in the second partial printing, the computer program causes the computer to control the print head to:

form the dots in the overlapping area and the second non-overlapping area; and not to form the dots in the first non-overlapping area, wherein in the generating of the dot data, the computer program further causes the computer to perform:

generating first data of the dot data, the first data corresponding to the non-overlapping area, by executing non-overlapping area processing for non-overlapping area data of the target image data, the non-overlapping area data corresponding to the non-overlapping area; and generating second data of the dot data, the second data corresponding to the overlapping area, by executing overlapping area processing for overlapping area data of the target image data, the overlapping area processing being different from the non-overlapping area processing, the overlapping data corresponding to the overlapping area, wherein the overlapping area processing includes:

first processing to be executed for values of pixels within a first color range; and second processing to be executed for values of pixels within a second color range different from the first color range, the second processing being different from the first processing, and wherein the first processing includes first density lowering processing of lowering a density of an image to be printed in the overlapping area, as compared to if the non-overlapping area processing was executed on the overlapping area data.

11. A control device for controlling a print execution device, the print execution device comprising a print head having a plurality of nozzles configured to eject ink, a head driver configured to cause the print head to eject the ink to form dots on a printing medium, and a mover configured to move the printing medium relative to the print head in a moving direction, the control device being configured to:
obtain target image data;
generate dot data indicating a formation state of the dots for each pixel using the target image data; and
control the print execution device to print a print image using the dot data by alternately executing a partial printing of controlling the print head to form the dots and a moving of controlling the mover to move the printing medium for plural times,
wherein in the controlling of the print execution device, the control device is configured to:
control the print execution device to execute a first partial printing;
control the mover to move the printing medium by a specific moving amount after the first partial printing; and
control the print execution device to execute a second partial printing after moving the printing medium by the specific moving amount,
in the first partial printing, the control device being configured to control the print head to:
form the dots in an overlapping area and a first non-overlapping area, the overlapping area including an upstream end of an area printable by the first partial printing with respect to the moving direction, the first non-overlapping area being a non-overlapping area different from the overlapping area and located downstream of the overlapping area of the area printable by the first partial printing with respect to the moving direction; and
not to form the dots in a second non-overlapping area, the second non-overlapping area being a non-overlapping area located upstream of the overlapping area of an area printable by the second partial printing with respect to the moving direction, and
in the second partial printing, the control device being configured to control the print head to:
form the dots in the overlapping area and the second non-overlapping area; and
not to form the dots in the first non-overlapping area,
wherein in the generating of the dot data, the control device is configured to:
generate data of the dot data corresponding to first area by executing first area processing for first area data of the target image data, the first area data corresponding to the first area, the first area being at least part of the overlapping area; and
generate data of the dot data corresponding to second area by executing second area processing for second area data of the target image data, the second area processing being different from the first area processing, the second area data corresponding to the second area, the second area being different from the first area,
wherein the first area processing includes:

first processing to be executed for values of pixels within a first range; and
second processing to be executed for values of pixels within a second range different from the first range, the second processing being different from the first processing; and
wherein the first processing includes first density lowering processing of lowering a density of an image to be printed in the first area, as compared to if the second area processing was executed on the first area data.

12. The control device according to claim 11, wherein the control device is configured to perform the first area processing for the first area data of the target image data, the first area data corresponding to the first area, the first area corresponding to center area of the overlapping area in the moving direction.

13. The control device according to claim 11, wherein the control device is configured to perform the first area processing for the first area data of the target image data, the first area data corresponding to the first area, the first area corresponding to:
the overlapping area;
part of the first non-overlapping area adjacent to the overlapping area; and
part of the second non-overlapping area adjacent to the overlapping area.

14. A printer comprising:
a print execution device comprising:
a print head having a plurality of nozzles configured to eject ink;
a head driver configured to cause the print head to eject the ink to form dots on a printing medium; and
a mover configured to move the printing medium relative to the print head in a moving direction; and
the control device according to claim 11.

15. A non-transitory computer-readable medium storing a computer program readable by a computer configured to control a print execution device, the print execution device comprising a print head having a plurality of nozzles configured to eject ink, a head driver configured to cause the print head to eject the ink to form dots on a printing medium, and a mover configured to move the printing medium relative to the print head in a moving direction, the computer program, when executed by the computer, causes the computer to perform:
obtaining target image data;
generating dot data indicating a formation state of the dots for each pixel by using the target image data; and
controlling the print execution device to print a print image using the dot data by alternately executing a partial printing of controlling the print head to form the dots and a moving of controlling the mover to move the printing medium,
wherein in the controlling of the print execution device, the computer program further causes the computer to perform:
controlling the print execution device to execute a first partial printing;
controlling the mover to move the printing medium by a specific moving amount after the first partial printing; and
controlling the print execution device to execute a second partial printing after moving the printing medium by the specific moving amount,
in the first partial printing, the computer program causes the computer to control the print head to:

form the dots in an overlapping area and a first non-overlapping area, the overlapping area including an upstream end of an area printable by the first partial printing with respect to the moving direction, the first non-overlapping area being a non-overlapping area different from the overlapping area and located downstream of the overlapping area of the printable by the first partial printing with respect to the moving direction; and not to form the dots in a second non-overlapping area, the second non-overlapping area being a non-overlapping area located upstream of the overlapping area of an area printable by the second partial printing with respect to the moving direction, and in the second partial printing, the computer program causes the computer to control the print head to:

form the dots in the overlapping area and the second non-overlapping area; and not to form the dots in the first non-overlapping area, wherein in the generating of the dot data, the computer program further causes the computer to perform:

generating data of the dot data corresponding to first area by executing first area processing for first area data of the target image data, the first area data corresponding to the first area, the first area being at least part of the overlapping area; and generating data of the dot data corresponding to second area by executing second area processing for second area data of the target image data, the second area processing being different from the first area processing, the second area data corresponding to the second area, the second area being different from the first area, wherein the first area processing includes:

first processing to be executed for values of pixels within a first color range; and second processing to be executed for values of pixels within a second color range different from the first color range, the second processing being different from the first processing, and wherein the first processing includes first density lowering processing of lowering a density of an image to be printed in the first area, as compared to if the second area processing was executed on the first area data.

* * * * *

UNITED STATES PATENT AND TRADEMARK OFFICE
CERTIFICATE OF CORRECTION

PATENT NO. : 11,077,672 B2
APPLICATION NO. : 16/804536
DATED : August 3, 2021
INVENTOR(S) : Maehira et al.

Page 1 of 1

It is certified that error appears in the above-identified patent and that said Letters Patent is hereby corrected as shown below:

In the Claims

Column 22, Claim 2, Line 30 should read:
processing not including processing of lowering the Column 23, Claim 6, Line 17 should read:
sponding to a plurality of types of inks to be used for Column 23, Claim 8, Line 47 should read:
corresponding to a plurality of types of inks to be used for Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*